(12) United States Patent
Kamleh

(10) Patent No.: US 11,638,439 B2
(45) Date of Patent: May 2, 2023

(54) VITAMIN D-FORTIFIED WATER AND METHOD OF MANUFACTURING THEREOF

(71) Applicant: AGTHIA, Abu Dhabi (AE)

(72) Inventor: Rabih Kamleh, Abu Dhabi (AE)

(73) Assignee: AGTHIA, Abu Dhabi (AE)

( * ) Notice: Subject to any disclaimer, the term of this patent is extended or adjusted under 35 U.S.C. 154(b) by 0 days.

(21) Appl. No.: 15/985,024

(22) Filed: May 21, 2018

(65) Prior Publication Data
US 2019/0350244 A1    Nov. 21, 2019

(51) Int. Cl.
| | | |
|---|---|---|
| A23L 33/155 | (2016.01) | |
| C01B 5/00 | (2006.01) | |
| C02F 9/00 | (2023.01) | |
| A23L 2/52 | (2006.01) | |
| A23L 33/16 | (2016.01) | |
| C02F 1/00 | (2023.01) | |
| C02F 1/66 | (2023.01) | |
| C02F 1/52 | (2023.01) | |
| C02F 1/44 | (2023.01) | |
| C02F 1/22 | (2023.01) | |
| C02F 5/08 | (2023.01) | |
| C02F 1/50 | (2023.01) | |
| C02F 1/68 | (2023.01) | |

(52) U.S. Cl.
CPC ............ *A23L 33/155* (2016.08); *A23L 2/52* (2013.01); *A23L 33/16* (2016.08); *C01B 5/00* (2013.01); *C02F 9/00* (2013.01); *A23V 2002/00* (2013.01); *C02F 1/001* (2013.01); *C02F 1/22* (2013.01); *C02F 1/441* (2013.01); *C02F 1/444* (2013.01); *C02F 1/50* (2013.01); *C02F 1/52* (2013.01); *C02F 1/66* (2013.01); *C02F 1/68* (2013.01); *C02F 5/08* (2013.01); *C02F 2303/04* (2013.01)

(58) Field of Classification Search
CPC .......... A23L 33/155; A23L 33/16; A23L 2/52; C01B 5/00; C02F 9/00; C02F 1/66; C02F 2303/04; A23V 2002/00
USPC ........................................................... 426/66
See application file for complete search history.

(56) References Cited

U.S. PATENT DOCUMENTS

| | | | | |
|---|---|---|---|---|
| 5,158,944 | A * | 10/1992 | Makino | A61K 9/145 514/167 |
| 5,597,595 | A * | 1/1997 | DeWille | A23L 2/00 426/590 |
| 6,042,908 | A * | 3/2000 | Long | C08L 67/02 206/524.1 |
| 6,559,216 | B1 * | 5/2003 | Zhao | C08K 5/005 524/366 |
| 2004/0258801 | A1 * | 12/2004 | Ling | A23L 2/02 426/72 |
| 2013/0126430 | A1 * | 5/2013 | Kenley | B01D 61/00 210/638 |

OTHER PUBLICATIONS

Tapola, NS. et al. Eur. J. Clinical Nutr. 58: 376-385 (2004) (Year: 2004).*

(Continued)

*Primary Examiner* — Hamid R Badr
(74) *Attorney, Agent, or Firm* — Hayes Soloway PC

(57) ABSTRACT

The present invention relates to a drinking product of vitamin D-fortified mineral water. The present invention further relates to methods of preparing packaged drinking product of the vitamin D-fortified water with minerals and/or natural mineral water, wherein the method essentially comprises water treatment, re-mineralization, ozonation, vitamin D dosing, and mineralization.

25 Claims, 12 Drawing Sheets

(56) References Cited

OTHER PUBLICATIONS

Gonnet, M. et al. J. of Controlled Release. 146: 276-290 (Year: 2010).*

* cited by examiner

2A

2B

3A

3B

VITAMIN D-FORTIFIED WATER AND METHOD OF MANUFACTURING THEREOF

FIELD OF THE INVENTION

The present disclosure relates to vitamin D-fortified drinking water and manufacturing method thereof, and more particularly to vitamin D-fortified mineral and/or bottled drinking water and a method for making the same.

BACKGROUND OF THE INVENTION

Vitamin D is a group of fat-soluble secosteroids responsible for increasing intestinal absorption of calcium, magnesium, and phosphate, and multiple other biological effects. In humans, the most important compounds in this group are vitamin D3 (also known as cholecalciferol) and vitamin D2 (ergocalciferol). Calcitriol (25-dihydroxyvitamin D3) is the biologically active form of vitamin D3 and controls calcium and phosphorus homeostasis, intestinal transport, bone metabolism, renal calcium reabsorption, blood pressure, and insulin secretion. Cholecalciferol and Ergocalciferol can be ingested from the diet and from supplements. Only few foods contain vitamin D. The major natural source of the vitamin is synthesis of cholecalciferol in the skin from cholesterol through a chemical reaction that is dependent on sun exposure (specifically UVB radiation). Dietary recommendations typically assume that all of a person's vitamin D is taken by mouth, as sun exposure in the population is variable and recommendations about the amount of sun exposure that is safe are uncertain in view of the skin cancer risk.

An estimated 1 billion people worldwide, have inadequate levels of vitamin D in their blood, and deficiencies can be found in all ethnicities and age groups; being more prevalent in places with limited sun exposure and in sunny countries like United Arab Emirates and the whole of Middle East.

Vitamin D deficiency may increase the risk of chronic diseases, such as osteoporosis, heart disease, a variety of cancers, multiple sclerosis, and infectious diseases including tuberculosis and seasonal flu. Also, evidence has shown that adequate levels of Vitamin D may prevent multiple bone disorders, such as rickets in children, and Osteoporosis, Osteomalacia, and Osteopenia, in adults.

Vitamin D deficiency in UAE has been reported in several peer reviewed published articles, it's estimated to be 39.9% among men, 35% among pregnant women and 45.4% among adolescents. In 2013, Anouti et al. reported 36% of vitamin D deficiency to occur among women. Hwalla et al. in 2017, reported that 45% vitamin D insufficiency among healthy adolescent in UAE. Additionally, in an observational study that was conducted on 60979 residents in UAE, researchers found that 18.4% with deficient and 39.9% with insufficient vitamin D status. Moreover, in another study (reported by Hwalla et al. in 2017) conducted on 243 multi-ethnic men residing in UAE, it was found that 48.2% were vitamin D deficient.

Accordingly, there remains the need for a vitamin D-fortified drinking product to provide consumers with the recommended daily intake of vitamin D.

SUMMARY OF THE INVENTION

The present invention relates to a drinking product of vitamin D-fortified mineral water. The present invention further relates to methods of preparing the drinking product of vitamin D-fortified mineral water. In other aspects, the present invention provides for a packaged drinking product of vitamin D-fortified mineral water.

The present invention relates to vitamin D-fortified drinking product and manufacturing method thereof. Accordingly, in a general aspect the present invention relates to a stabilized, long shelf-life vitamin D-fortified drinking product and a method for making the same. In another aspect of the present invention, the vitamin D fortified drinking product further optionally comprises mineral supplements, wherein said mineral supplements are preferably nutrient minerals, for example and not limited to Calcium, Magnesium, Sodium, and Potassium. The drinking mineral product essentially comprises water dispersible vitamin D. The present invention provides for a vitamin D-fortified mineral water which in addition to hydration, will help consumer to get about 33% of the Recommended Daily Intake RDI of vitamin D, when two liters of the product will be consumed (RDI-600 IU as per Institute of Medicine—USA) free from sugars, sweeteners, preservatives, colorants and flavors.

Accordingly, the embodiments of the present invention provide for a drinking product, comprising water fortified with a vitamin-D composition; wherein the drinking product is a dietary supplement. In these embodiments, the vitamin D is selected from the group comprising vitamin D2, vitamin D3, and Calcitriol (25-dihydroxyvitamin D3) and/or mixtures thereof. In one embodiment, the vitamin D is vitamin D3. In other aspect, the vitamin D is vitamin D3 with the following chemical formula $C_{27}H_{44}O$ vitamin D3 Type 100 (cholecalciferol).

In some aspects, vitamin D is dispersible in water. In these aspects, the vitamin D has a dispersed particle size of about less than 850 μm. In other aspects, at least 90% of vitamin D has a dispersed particle size of about less than 425 μm. In some aspects, up to 15% of vitamin D has a dispersed particle size of about less than 150 μm. In these aspects, water is the carrier of vitamin D.

In some embodiments, the vitamin D-fortified water has no natural or artificial sweeteners, sugars, colorants, flavors, or preservatives. In other embodiments, vitamin D in the range of 0.07 to 0.15 IU/ml. In these embodiments, at least about 0.1 IU of vitamin D per ml of the drinking product. In other embodiments, the used vitamin D composition comprises vitamin D, sucrose, gum *Arabica*, corn starch, tricalcium phosphate, MCT oil, and dl-α tocopherol. In some embodiments, the drinking product has a pH between about 6.5 and about 8. A skilled person in the art appreciates and knows that this pH range can be different in view of local, international, and different industry standards.

The present invention provides for a drinking product that further comprising a mineral. IN these embodiments, the mineral is at least one mineral selected from the group comprising of sodium, potassium, magnesium, calcium and/or acceptable salts and mixtures thereof. In this embodiment, the at least one mineral is calcium. In these embodiments, calcium is added at a concentration of about 60 μg/ml. In some aspects of the present invention, the water is mineral water. In these aspects, the mineral water is spring water or well water.

In some embodiments, the drinking product has total dissolved solids in the range of 252.5 to 277.5 mg/L and turbidity <5 NTU. In these embodiments, the drinking product has a shelf life of about not less than 5 months. A skilled person in the art appreciates and knows that the total dissolved solids and turbidity range can be different in view of local, international, and different industry standards.

The present invention further provides for a packaged drinking product, comprising water fortified with vitamin-D composition in a UV-barrier package. In some aspects, the UV barrier package is essentially made from PET (polyethylene terephthalate) with a UV-scavenger. In these aspects, the UV-scavenger is added to PET at a concentration of about 0.21 pph. A skilled person in the art appreciates that the UV scavenger can be added at any concentration to get about zero transmission of UV of 380 nm wavelength.

In some aspects, in the packaged drinking product vitamin D is vitamin D3. In other aspects, vitamin D of the packaged drinking product is dispersible in water. In some aspects, vitamin D has a dispersed particle size of less than 850 μm. In these aspects, at least 90% of vitamin D has a dispersed particle size of about less than 425 μm. In same aspects, up to 15% of vitamin D has a dispersed particle size of about less than 150 μm. A skilled person in the art appreciates and knows that the size range of vitamin D particles can be different in view of different industry standards and practices.

The present invention provides for a packaged drinking product, comprising vitamin D in the range of 0.07 to 0.15 IU/ml. In these embodiments, at least about 0.1 IU of vitamin D per ml of the drinking product, and more preferably at least about 0.065 IU of vitamin D per ml of the drinking product. In these aspects, the packaged drinking product further comprising added calcium. In some aspects, the vitamin D composition comprises vitamin D, sucrose, gum *Arabica*, corn starch, tricalcium phosphate, MCT oil, and dl-α tocopherol. In these aspects, the package is in the form of a can or bottle. In some aspects, the package is in the form of a bottle. A skilled person in the art appreciates and knows that the packaging may be in any other packaging form. In these aspects, the packaged drinking product has a shelf life of 5 months. In these aspects, the drinking product, has no metallic taste or aftertaste, and wherein no flavors, sweeteners, colorant or preservative have been added to the drinking product. In some aspects of the present invention, the water is mineral water. In these aspects, the mineral water is spring water or well water.

The present invention further provides for a method of preparing a drinking product, comprising:
 a) treating water to remove particles, chlorine, reduce TDS (total dissolved solids), and to prevent microbial growth;
 b) re-mineralizing of the treated water to get the right concentration of the desired minerals in the final drinking product as per internal recipe specification and in compliance with regulations;
 c) ozoning the treated water to disinfect the treated water after re-mineralization;
 d) preparing a stock solution of vitamin D composition with a calculated concentration of dispersible vitamin D required to reach desired dose of vitamin D in final drinking product;
 e) adjusting required control steps to reach the desired dose of vitamin D in the final drinking product, wherein the control steps are flow rate of re-mineralized treated water, dosing rate of the solution of the dispersible vitamin D, and ozone levels;
 f) mixing the right amount of the stock solution of vitamin D composition with the re-mineralized treated water; and
 g) Adding UV-barrier to the PET bottle that will filled with vitamin-D fortified re-mineralized treated water, wherein the UV-barrier/PET bottle is made of PET resin mixed with a UV scavenger to protect the vitamin-D fortified re-mineralized treated water against the impact of UV light.

In some embodiments, the vitamin D composition comprises vitamin D, sucrose, gum *Arabica*, corn starch, tricalcium phosphate, MCT oil, and a tocopherol to be dispersible in water. A skilled person in the art appreciates that other ingredients can be added to the vitamin D composition to protect and enhance vitamin D. In other embodiments, the treated water is fortified with vitamin D composition at a predetermined dosing rate to reach a desired final dose of vitamin D in the drinking product.

In some aspects, the desired final dose of vitamin D in the drinking product is within 0.07 to 0.15 IU/ml. In these aspects, the desired final dose of vitamin D in the drinking product is 0.1 IU/ml. In other aspects, a determined dose of calcium is added to the vitamin D-fortified mineral water. In some aspects, vitamin D dosing is preferably carried out simultaneously with calcium dosing. In other aspects, vitamin D dosing is preferably carried out consecutively with calcium dosing. In some aspects of the invention, vitamin D dosing is preferably carried out simultaneously with other minerals dosing. In other aspects of the invention, vitamin D dosing is preferably carried out consecutively with other minerals dosing. In some aspects, vitamin D dosing is preferably carried out consecutively with calcium and other minerals dosing.

In some embodiments, the UV scavenger is added to PET at a concentration of about 0.21%. A skilled person in the art appreciates that the UV scavenger can be added at an appropriate concentration to have the lowest transmission of UV light through PET or any other packaging material. In these embodiments, the vitamin D-fortified mineral water has a shelf life of about 5 months.

In some embodiments, the step of water treatment essentially comprising: primary treatment, pre-treatment, and post treatment of raw water. In these embodiments, the primary treatment of the raw water essentially comprising the sub-steps of microfiltration, disinfection, pH adjustment, flocculation, and filtration steps. In other embodiments, the first step of disinfection of "raw water" received from public network and/or wells is carried out using a hypochlorite compound. In some embodiments, the flocculation is carried out using ferric chloride to remove dissolved iron. In other embodiments, the filtration steps comprise activated carbon filtration.

In some embodiments, the pre-treatment of water essentially comprising the sub-steps of: micron filtration, cooling through heat exchanger plate, pH adjustment, anti-scalant dosing, reverse osmosis, disinfection, and pH balancing.

In other embodiments, the post treatment of the water is essentially carried out via CHRIWA 2 type water treatment and/or ICE 1 type water treatment, collectively or alternatively. In some embodiments, the CHRIWA 2 water treatment essentially comprising the sub-steps of: micron filtration, activated carbon filtration, cooling through heat exchanger plate, micron cartridge filtration, UV disinfection, anti-scalant dosing, and reverse osmosis. In other embodiments, the ICE 1 water treatment essentially comprising micron filtration, activated carbon filtration, cooling through heat exchanger plate, micron cartridge filtration, UV disinfection, anti-scalant dosing, and reverse osmosis.

In some aspects, the ozonated water has ozone residual concentration of about 0.20 to about 0.25 ppm. In other aspects, the drinking product has total dissolved solids in the range of 252.5 to 277.5 mg/L and turbidity <5 NTU. In some aspects, the drinking product has a pH that should be between about 6.5 and about 8 as per local regulations. A skilled person in the art appreciates and knows that these ranges can be different in view of local, international, and different industry standards.

Hereinafter the different embodiments of the present invention is described in detail, however the scope of the present invention should not be restricted to these descriptions, even with the addition to the following examples as appropriate without departing from the spirit of the present invention it may change implementation.

DETAILED DESCRIPTION OF THE INVENTION

Figure 1A:
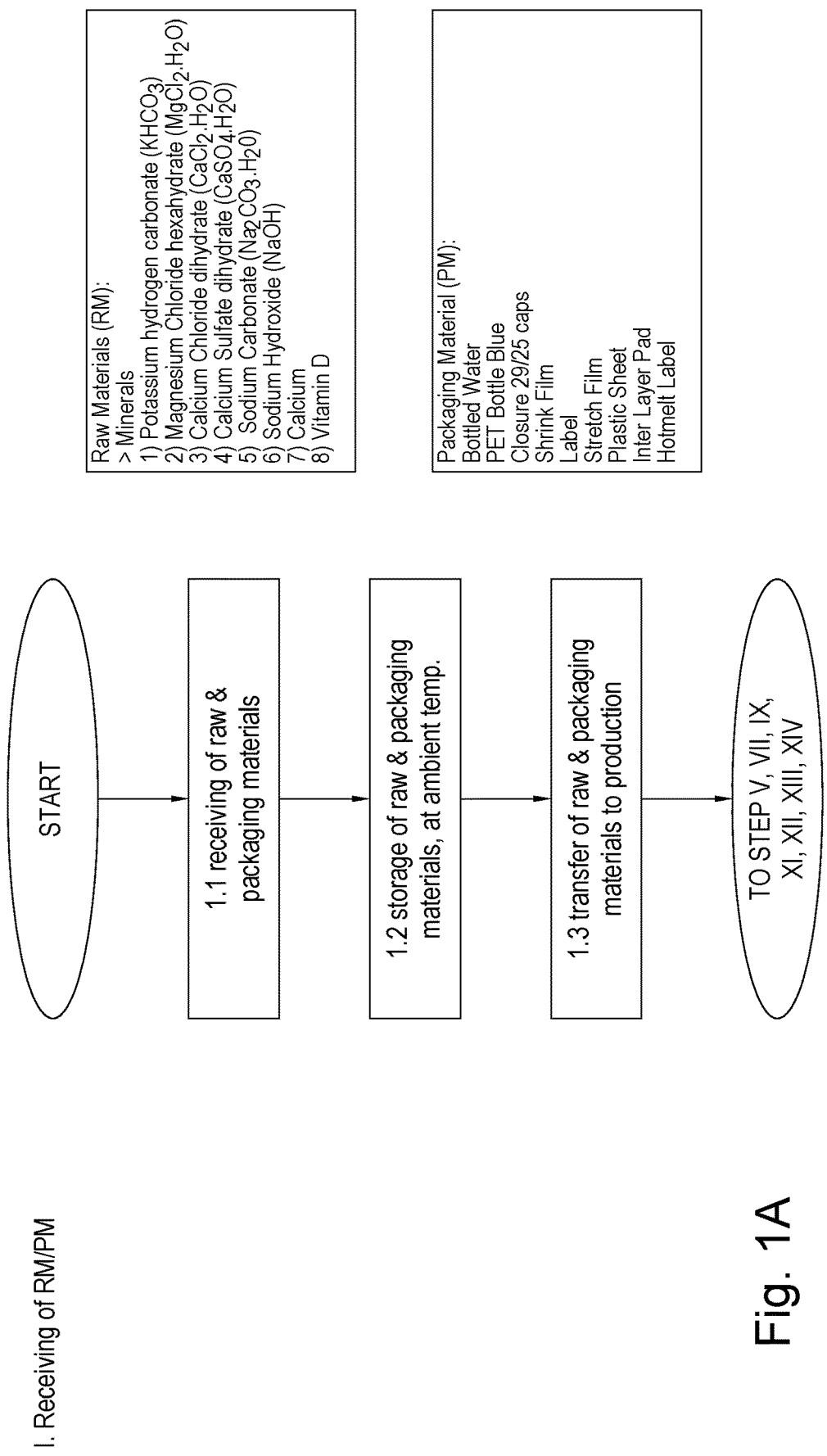
FIGS. 1A-I provide a process flow diagram illustrating a method of making a vitamin D-fortified drinking product in accordance with the present invention.

It is an object of the present invention to provide water supplemented with Vitamin D and useful nutrient minerals that have excellent bioavailability, the mineral and/or bottled drinking water containing vitamin D does not have an off-flavor/aftertaste, is stable, and overcomes the problem of instability caused by the addition of vitamins to water. The fortified vitamin D drinking water preferably comprises minerals and other nutrients. The present invention further relates to packaged said drinking water, preferably in PET containers with UV-barrier materials to ensure the stability of the vitamin D-fortified drinking mineral water and to maintain the declared amount of vitamin D during storage at the preferably defined temperature for more than 5 months. The present invention further relates to a method of making the drinking mineral water fortified with vitamin D that avoids instability of vitamin D in the water.

Mineral water used in the embodiments of the present invention can be any water supplemented with minerals. A skilled person in the art understands that mineral water may be spring water or well water.

Traditional fortification of vitamin D have been done in products containing fat e.g. dairy products. However, it has been reported that different groups in different countries have low consumption of dairy products fortified with vitamin D. Water is globally consumed and in the present invention, it has been selected as the carrier for vitamin D. As such, the invented product fits the purpose of hydration and helps consumer to have easy source of vitamin D.

In the global markets, some beverages are fortified with vitamin D; however all these beverages contain sugars, sweeteners, colorants, flavors, and or preservatives which limit their consumption. The invented product is a drinking water fortified with minerals and vitamin D, and stable with long shelf life in PET/UV-barrier bottles.

It is an object of the present invention to provide a method for producing water with minerals and fortified with water dispersible vitamin D, and to maintain the stability of vitamin D in water and the balance of useful minerals such as Calcium, Magnesium, Sodium, and Potassium and reduced ions, such as sulfate ions ($SO_4^{-2}$), and chlorine ion ($Cl^-$) which are undesirable for taste.

The present invention relates to drinking water supplemented with a dispersible vitamin D. The drinking water fortified with the dispersible vitamin D does not have natural or artificial sweeteners, sugars, colorants, flavors, or preservatives. The vitamin D-fortified drinking water can optionally include minerals, such as calcium. The present invention further relates to a packaged vitamin D-fortified drinking water, wherein the package is preferably made from UV-barrier materials to ensure the stability of the vitamin D-fortified drinking water. The present invention further relates to methods of preparing the packaged vitamin D-fortified drinking water with enhanced stability and that does not have natural or artificial sweeteners, sugars, colorants, flavors, or preservatives.

In the embodiments of the present invention, vitamin D refers to all vitamin D species, including vitamin D2 and vitamin D3. "Vitamin D2," as used herein, refers to vitamin D2 in all its forms, including but not limited to, ergocalciferol, ergosterol, and 7-dehydrocholesterol. "Vitamin D3," as used herein, refers to vitamin D3 in all its forms, including but not limited to, cholecalciferol, calciol, calcidiol, and calcitriol (25-dihydroxyvitamin D3). The term "enhanced stability" of vitamin D, refers to the ability of a set of conditions to inhibit the degradation of vitamin D compared to the degradation of vitamin D under control conditions. The term "purified," refers to a substance that, prior to mixing with another substance, is at least 75%, 85%, 90%, 95%, 100% free of any other substance.

In the embodiments of the present invention, vitamin D can be purified vitamin D or a composition that comprises vitamin D (e.g. vitamin D can be a mixture which contains vitamin D). In different embodiments, vitamin D is obtained from natural or synthetic sources. Vitamin D can be contained in an extract obtained from plant material (e.g. tomato leaf). In some embodiments, vitamin D can be vitamin D2, vitamin D3, or a combination thereof. Vitamin D3 is more potent than vitamin D2 and raises blood levels of vitamin D more than vitamin D2.

Vitamin D2 can be ergocalciferol, ergosterol, 7-dehydrocholesterol, or a combination thereof. The ergocalciferol, ergosterol, and/or 7-dehydrocholesterol can be purified. Vitamin D3 can be cholecalciferol, calciol, calcidiol, calcitriol (25-dihydroxyvitamin D3), or a combination thereof. The cholecalciferol, calciol, calcidiol, and/or calcitriol (25-dihydroxyvitamin D3) can be purified. Vitamin D can be selected from the group comprising of, but not limited to, ergocalciferol, ergosterol, 7-dehydrocholesterol, cholecalciferol, calciol, calcidiol, calcitriol (25-dihydroxyvitamin D3), and a combination thereof. In some aspects, vitamin D is cholecalciferol (vitamin D3, Type 100: $C_{27}H_{44}O$).

Vitamin D can be obtained from different sources: Sun exposure, natural food sources, dietary supplements, and fortified foods. Natural food sources are poor in Vitamin D content. It has been estimated that people cannot obtain more than 2 μg (80 IU)/day of Vitamin D from dietary intake while according to Institute of Medicine recommendation, adults require at least 15 μg (600 IU)/day of Vitamin D to improve bone functions. Hence, the need of Vitamin D-fortified foods, drinks, or supplements. Fortified foods with vitamin D is known to improve serum vitamin D status. Canada and United States are famous countries that fortified some foods such as dairy products, margarine and breakfast cereals. Milk is the most commonly food source for Vitamin D fortification, but it seems that consumption of milk has gradually declined during the past decades. Moreover, considering the high levels of lactose deficiency, many children and adults avoid to drink it continually. Hence, research is ongoing to introduce more sources of food that seems to be feasible for fortification with vitamin D The stability of vitamin D is reported in bread, orange juice, cheddar cheese, and edible oils. The present invention relates to vitamin D-fortified drinking water as a practical source of vitamin D supplement.

Vitamin D is a lipo-soluble vitamin, therefore an oil-dispersible form is used for food fortification, preferably dairy products. In the embodiments of the present invention, a water-dispersible vitamin D is used. In contrary to solution, dispersion is a dual phase or multiphase where the dispersed particle retain its substance. In some embodiments, water is the carrier of vitamin D It is known that one skilled in the art may perceive that vitamin D may have different structures, such as, but not limited to, inverted micelles, nanoparticles. etc. In aspects of the present invention, dispersible vitamin D is protected by sucrose, gum Arabic (E 414), corn starch, MCT oil, tricalcium phosphate (E 341), and dl-α tocopherol (E 307).

In different embodiments of the present invention, vitamin D has a particle size of less than about 1000 µm, less than about 950 µm, less than about 900 µm, less than about 850 µm, less than about 800 µm, less than about 750 µm, less than about 700 µm, less than about 650 µm, less than about 600 µm, less than about 550 µm, or less than about 500 µm. A skilled person in the art appreciates and knows that the size range of vitamin D particles can be different in view of different industry standards and practices.

In different embodiments, vitamin D may be homogenous with regard to the particle size or may have a mixture of different particle sizes. In some embodiments, at least about 90% of vitamin D particles have size of less than about 500 µm, less than about 475 µm, less than about 450 µm, less than about 425 µm, less than about 400 µm, less than about 375 µm, less than about 350 µm, less than about 325 µm, less than about 300 µm, less than about 275 µm, less than about 250 µm, less than about 225 µm, or less than about 200 µm. In some embodiments, at least about 80% of vitamin D particles have size of less than about 500 µm, less than about 475 µm, less than about 450 µm, less than about 425 µm, less than about 400 µm, less than about 375 µm, less than about 350 µm, less than about 325 µm, less than about 300 µm, less than about 275 µm, less than about 250 µm, less than about 225 µm, or less than about 200 µm. In some embodiments, at least about 70% of vitamin D particles have size of less than about 500 µm, less than about 475 µm, less than about 450 µm, less than about 425 µm, less than about 400 µm, less than about 375 µm, less than about 350 µm, less than about 325 µm, less than about 300 µm, less than about 275 µm, less than about 250 µm, less than about 225 µm, or less than about 200 µm. In some embodiments, at least about 60% of vitamin D particles have size of less than about 500 µm, less than about 475 µm, less than about 450 µm, less than about 425 µm, less than about 400 µm, less than about 375 µm, less than about 350 µm, less than about 325 µm, less than about 300 µm, less than about 275 µm, less than about 250 µm, less than about 225 µm, or less than about 200 µm. In some embodiments, at least about 50% of vitamin D particles have size of less than about 500 µm, less than about 475 µm, less than about 450 µm, less than about 425 µm, less than about 400 µm, less than about 375 µm, less than about 350 µm, less than about 325 µm, less than about 300 µm, less than about 275 µm, less than about 250 µm, less than about 225 µm, or less than about 200 µm. A skilled person in the art appreciates and knows that the size range of vitamin D particles can be different in view of different industry standards and practices.

In some embodiments, up to about 25% of vitamin D particles have size of less than about 250 µm, less than about 225 µm, less than about 200 µm, less than about 175 µm, less than about 150 µm, less than about 125 µm, less than about 100 µm, less than about 75 µm, less than about 50 µm, or less than about 25 µm. In some embodiments, up to about 20% of vitamin D particles have size of less than about 250 µm, less than about 225 µm, less than about 200 µm, less than about 175 µm, less than about 150 µm, less than about 125 µm, less than about 100 µm, less than about 75 µm, less than about 50 µm, or less than about 25 µm. In some embodiments, up to about 15% of vitamin D particles have size of less than about 250 µm, less than about 225 µm, less than about 200 µm, less than about 175 µm, less than about 150 µm, less than about 125 µm, less than about 100 µm, less than about 75 µm, less than about 50 µm, or less than about 25 µm. In some embodiments, up to about 10% of vitamin D particles have size of less than about 250 µm, less than about 225 µm, less than about 200 µm, less than about 175 µm, less than about 150 µm, less than about 125 µm, less than about 100 µm, less than about 75 µm, less than about 50 µm, or less than about 25 µm. In some embodiments, up to about 5% of vitamin D particles have size of less than about 250 µm, less than about 225 µm, less than about 200 µm, less than about 175 µm, less than about 150 µm, less than about 125 µm, less than about 100 µm, less than about 75 µm, less than about 50 µm, or less than about 25 µm. A skilled person in the art appreciates and knows that the size range of vitamin D particles can be different in view of different industry standards and practices.

Globally, vitamin D has been added to milk in Canada and the United States since the 1920s, a policy that has been largely responsible for the elimination of vitamin D deficiency rickets in children. Milk and other dairy products, including dried milk powder and evaporated milk, are often fortified with vitamin D. Many countries also fortify margarines with this vitamin. (FAO [Food and Agriculture Organization] and WHO [World Health Organization] ISBN 92 4 159401 2). But the low consumption of fortified dairy products by some elderly individuals, and by some African-American populations, are still associated with a much higher risk of vitamin D deficiency among these groups. Vitamin D has been added in last years to juice mainly orange juice and beverages containing sweeteners, sugars, preservatives, colorants and flavors. These vitamin D-fortified beverages have the disadvantage of containing high sugar levels and synthetic preservatives which pose a health concern for different groups, e.g. diabetic subjects. In the aspects of the present invention, the vitamin D-fortified water has no natural or artificial sweeteners, no metallic taste or aftertaste, sugars, colorants, flavors, or preservatives. Hence, the vitamin D-fortified water of the present invention poses no health concerns for subjects.

Nowadays, exposure to sunlight is rather low due to a preference for indoor activities. Additionally, with inactive lifestyles and poor food habits, such vitamin D deficiency can also result in a number of health implications. It can be consumed daily like regular water. The recommended daily allowance (RDA) for human subjects is 600 international units (IU). The present invention provides for a vitamin D-fortified drinking water, wherein vitamin D is preferably at a dose of 0.1 IU/ml of the drinking product. Therefore, consuming two liters of the vitamin D-fortified drinking water of the present invention will provide 200 IU of vitamin D. Therefore, the product of the present invention will not only hydrates the subject but also supplements a portion of the daily intake of Vitamin D.

In other aspects of the present invention, the vitamin D-fortified drinking mineral water has vitamin D at about 0.025 IU/ml, about 0.5 IU/ml, about 0.75 IU/ml, about 0.1 IU/ml, about 0.25 IU/ml, about 0.3 IU/ml, about 0.4 IU/ml, about 0.5 IU/ml, about 0.6 IU/ml, about 0.7 IU/ml, about 0.8 IU/ml, about 0.9 IU/ml, about 1.0 IU/ml, about 2.0 IU/ml, about 3.0 IU/ml, about 4.0 IU/ml, about 5.0 IU/ml, about 6.0 IU/ml, about 7.0 IU/ml, about 8.0 IU/ml, about 9.0 IU/ml, or about 10.0 IU/ml of the product. A one skilled in the art can foresee that the vitamin D-fortified drinking water is provided in batches of, but not limited to, 300 ml, 500 ml, 1 L, 2 L, or any foreseeable volume for the market and any other type of packaging other than PET Vitamin D is associated with improved absorption of essential minerals including, for example, calcium, magnesium, iron, phosphate, zinc, and copper. It is well established that vitamin D induces intestinal absorption of calcium by activating the signaling pathways for calcium transport across the plasma membrane. Vitamin D also stimulates calcium mobilization from bone playing an important role in initiating bone remodeling and repairing. Vitamin D can regulate serum phosphate level by modulating expression of Fibroblast growth factor 23 and as a calciotropic hormone. Therefore, phosphate and vitamin D metabolism are highly interconnected. Therefore, it's beneficial to supplement the vitamin D-fortified drinking water with one or more of essential mineral, e.g. calcium.

In different aspects of the present invention, the vitamin D-fortified drinking water is supplemented with a mineral, wherein the mineral is at least one mineral selected from a group comprising of, but not limited to, sodium, potassium, magnesium, calcium and/or acceptable salts and mixtures thereof. In other aspects, the vitamin D-fortified drinking water is supplemented with a mineral selected from a group comprising of Calcium, Magnesium, Sodium, Potassium, Chloride, Sulfate, Bicarbonate, Nitrates, Carbonate In some aspects, the vitamin D-fortified drinking mineral water is supplemented with calcium at a concentration of about 10 µg/ml, about 20 µg/ml, about 30 µg/ml, about 40 µg/ml, about 50 µg/ml, about 60 µg/ml, about 70 µg/ml, about 80 µg/ml, about 90 µg/ml, or about 100 µg/ml. In other aspects, the vitamin D-fortified drinking water is supplemented with magnesium at a concentration of about 10 µg/ml, about 11 µg/ml, about 12 µg/ml, about 13 µg/ml, about 14 µg/ml, about 15 µg/ml, about 16 µg/ml, about 17 µg/ml, about 18 µg/ml, about 19 µg/ml, or about 20 µg/ml. In other aspects, the vitamin D-fortified drinking mineral water is supplemented with sodium at a concentration of about 1 µg/ml, about 2 µg/ml, about 3 µg/ml, about 4 µg/ml, about 5 µg/ml, about 6 µg/ml, about 7 µg/ml, about 8 µg/ml, about 9 µg/ml, or about 10 µg/ml. A skilled person in the art appreciates that minerals can be added at a different concentration as instructed and in view of local, international, and different industry standards.

In other aspects, the vitamin D-fortified drinking mineral water is supplemented with potassium at a concentration of about 0.5 µg/ml, about 1 µg/ml, about 2 µg/ml, about 3 µg/ml, about 4 µg/ml, or about 5 µg/ml. A skilled person in the art appreciates that potassium can be added at a different as instructed and in view of local, international, and different industry standards.

In some aspects, the vitamin D-fortified drinking mineral water is supplemented with chloride at a concentration of about 100 µg/ml, about 110 µg/ml, about 120 µg/ml, about 130 µg/ml, about 140 µg/ml, about 150 µg/ml, about 160 µg/ml, about 170 µg/ml, about 180 µg/ml, about 190 µg/ml, or about 200 µg/ml. In other aspects, the vitamin D-fortified drinking mineral water is supplemented with sulfate at a concentration of about 1 µg/ml, about 2 µg/ml, about 3 µg/ml, about 4 µg/ml, about 5 µg/ml, about 6 µg/ml, about 7 µg/ml, about 8 µg/ml, about 9 µg/ml, or about 10 µg/ml. In other aspects, the vitamin D-fortified drinking mineral water is supplemented with bicarbonate at a concentration of about 0.05 µg/ml, about 0.1 µg/ml, about 0.2 µg/ml, about 0.3 µg/ml, about 0.4 µg/ml, about 0.5 µg/ml, about 0.6 µg/ml, about 0.7 µg/ml, about 0.8 µg/ml, about 0.9 µg/ml, or about 1.0 µg/ml. A skilled person in the art appreciates that chloride can be added at a different as instructed and in view of local, international, and different industry standards.

The present invention also provides for a packaged drinking product, comprising a vitamin-D fortified mineral water in a UV-barrier package, wherein the vitamin D-fortified drinking mineral water can be supplemented with a mineral as described above. The UV-barrier package is essentially made from PET (polyethylene terephthalate) with a UV-barrier/scavenger material. Prolonged sun exposure can result in degradation of vitamin D non-biologically active products, hence the present invention discovered to enhance the stability of the vitamin D-fortified drinking mineral water by packaging in a PET/UV-barrier package.

Figure 4:
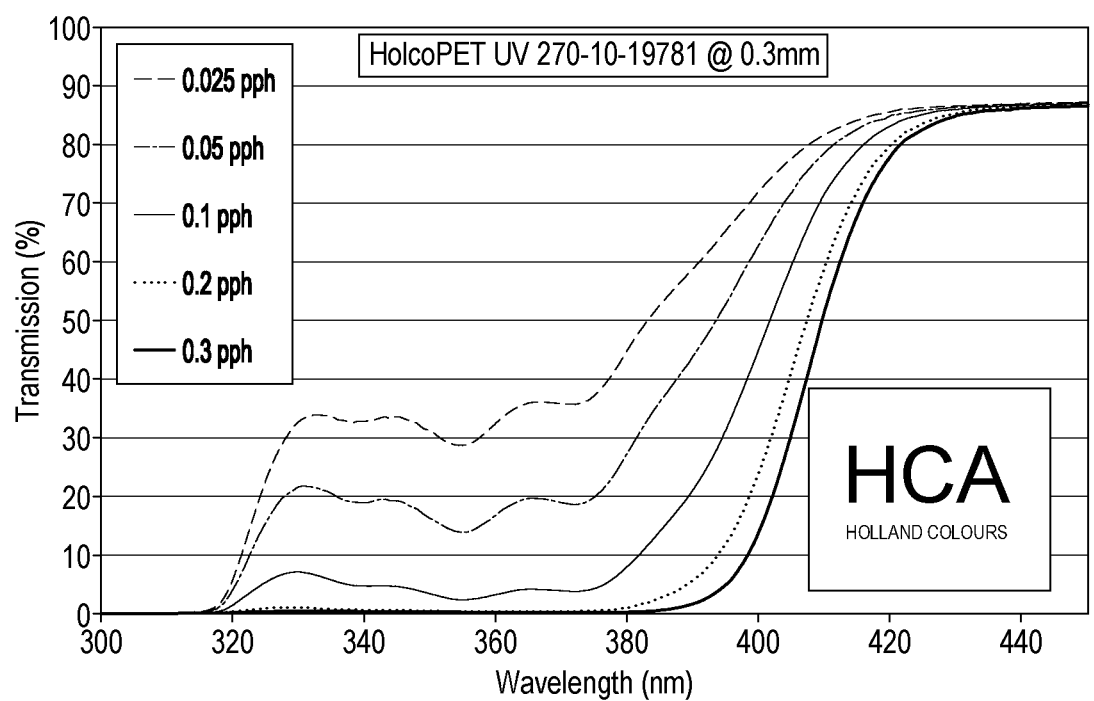
FIG. 4 shows different concentrations of UV barrier/scavenger for protection of UV wavelengths.

In some aspects, the UV-barrier/scavenger material is added to PET resin to reach a protection of 380 nm wavelength (as shown in FIG. 4), which enhance the stability of vitamin D in shelf-life. In some aspects, the UV-barrier/scavenger material is added to PET resin at a concentration of about 0.025 pph, about 0.05 pph, about 0.1 pph, about 0.2 pph, about 0.3 pph, about 0.4 pph, or about 0.5 pph. A skilled person in the art appreciates that the UV scavenger can be added at any concentration to have the appropriate protection from UV light, i.e. to get about zero transmission of UV of 380 nm wavelength. In a preferred aspect, the UV-barrier/scavenger material is preferably added to PET at a concentration of about 0.21 pph. In some embodiments, the UV scavenger is a mixture of:

a) polyethylene glycol (EO=1-30, typically 5) ether of butyl 2-cyano 3-(4-hydroxy-3-methoxyphenyl) acrylate [at concentration >=50%];

b) 2,2-(1,4-phenylene)bis((4H-3,1-benzoxazine-4-one) [at concentration of 10-25%]; and c) C.I. Solvent Violet 13 [at concentration of 0.1-1%]

In other embodiments, a skilled one in the art can foresee from the present invention different concentrations and mixtures to act as a UV-barrier/scavenger to protect and hence enhance the stability of vitamin D.

Figure 2:
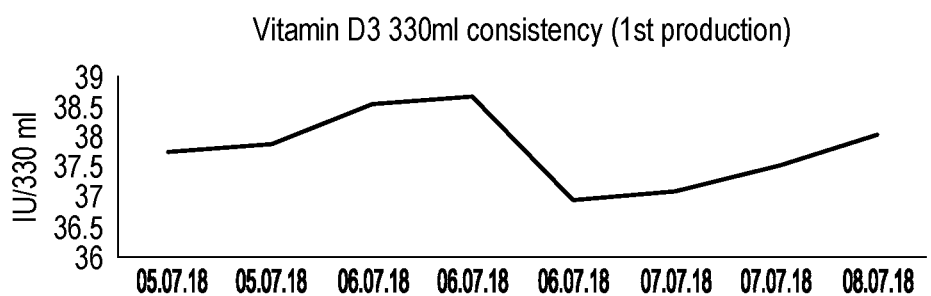
FIG. 2 shows levels of vitamin D3 in the final products in 330 ml bottles. Panel 2A shows the levels of vitamin D in first production. Panel 2B shows the levels of vitamin D in second production.
Figure 2:
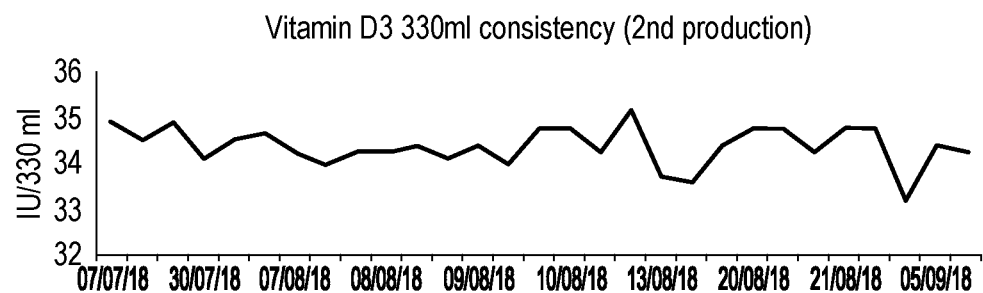
Figure 3:
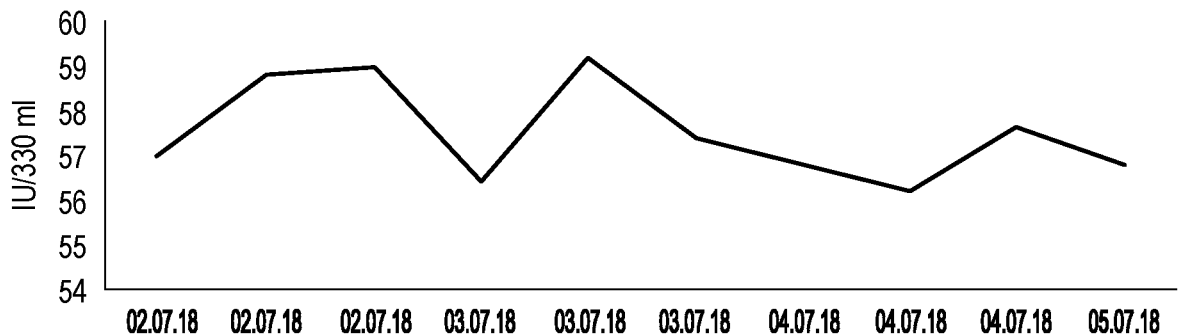
FIG. 3 shows levels of vitamin D3 in the final products in 500 ml bottles. Panel 3A shows the levels of vitamin D in first production. Panel 3B shows the levels of vitamin D in second production.
Figure 3:
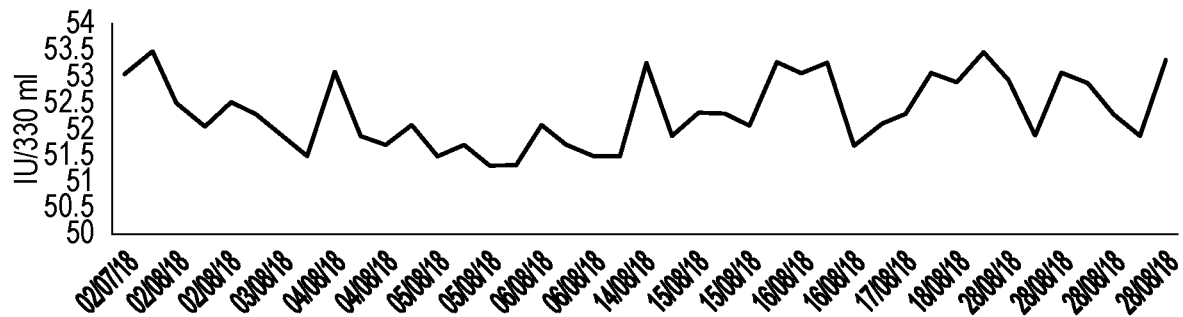

In these aspects of the present invention, wherein the UV-barrier/scavenger material is added to PET to produce a UV-barrier package, the vitamin D-fortified drinking mineral water has an enhanced stability and longer shelf-life (vitamin D consistency as shown in FIGS. 2-3). In these aspects, the enhanced drinking water, fortified with vitamin D, has a shelf-life of about 1 month, about 2 months, about 3 months, about 4 months, about 5 months, about 6 months, about 7 months, about 8 months, about 9 months, about 10 months, about 11 months, or about 12 months. A skilled person or artisan in the art appreciates that shelf-life of the invented drinking mineral water enhanced with vitamin D can vary and be longer than a year depending on the used vitamin D.

The PET/UV-barrier package can be in the shape of a bottle, can, or any container that can hold a beverage and allow a consumer, e.g. human subject, to have access to the vitamin D-fortified drinking mineral water. In one of the aspects, the PET/UV-barrier package is preferably a bottle with a cap.

The present invention further provides a method of preparing the vitamin D-fortified drinking mineral water as it can be appreciated by reference to the following detailed description.

FIGS. 1A-I provide a detailed process flow diagram illustrating the method of making vitamin D-fortified drinking mineral water in accordance with the present invention. The raw water according to the present invention can be any type of water, preferably public network water, preferably treated public network water, preferably surface water, preferably the underground water, well water and more preferably spring water. A skilled person in the art understands that mineral water may be spring water or well water.

In accordance with one embodiment of the present invention, the vitamin D-fortified drinking mineral water comprises one or more useful mineral nutrient selected from and not limited to calcium ($Ca^{++}$), magnesium ($Mg^{++}$), sodium ($Na^+$), and potassium ($K^+$) as mentioned above.

The embodiments of the present invention provide a method of preparing the drinking water with minerals and fortified with vitamin D, wherein the method essentially comprises the steps of: receiving of raw water from the source, primary treatment of the received water, pre-treatment, post treatment (CHRIWA 2 water treatment and/or ICE 1 water treatment), re-mineralization, ozonation of water, vitamin D dosing and mineralization, bottle blowing, filling, capping, and packaging.

Withdrawal of well water is conventionally carried out by suction method, pumping method, or a similar method. In this step, the source of raw water is placed into holding tanks via suitable delivery piping (Step 2.2.1, FIG. 1B). Water received is filtered using 100μ bag filters to trap and remove dirt particles of more than 100μ in size (Step 2.2.2, FIG. 1B), and then the filtrate stored in storage tanks (Step 2.2.3, FIG. 1B). The stored water is then disinfected using sodium hypochlorite through circulation pump at flow rate of 386 ml/h. The resulting chlorinated water typically, has free chlorine residue of 0.15-0.30 ppm concentration to eliminate and prevent microbial growth at acceptable level.

Figure 1B:
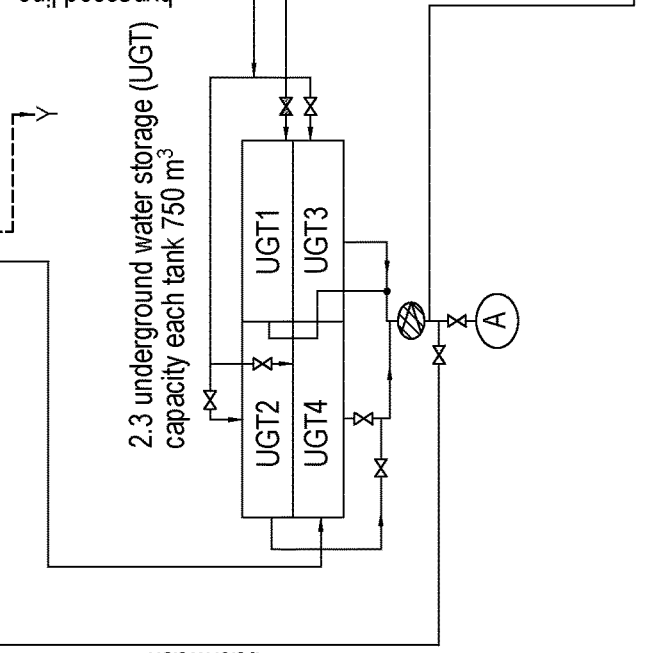

The resulting disinfected water is further treated with sulfuric acid through circulation pump to reduce the pH, wherein the pH is being monitored through online pH monitoring unit (2.2.4, FIG. 1B). Next, a pre-dissolved ferric chloride using direct compressed air to the ferric chloride dosing unit (2.2.5.1, FIG. 1B), is added to the water tank at flow rate of 584 mg/L, which is known as flocculation (2.2.5.2, FIG. 1B). Flocculation helps in making tiny particles to clump together so they can be removed from water in the subsequent step using sand filters with flow rate of 50 $m^3$/h, wherein said sand filters are designed with back wash facilities (2.2.6, FIG. 1B).

Storage of water from the previous step at ambient temperature for further distribution takes place in underground water tanks built from non-corrosive material to avoid reaction with stored water. (2.3, FIG. 1B). In the following step, the raw water is filtered through activated carbon filter to remove the residual chlorine available in the water (2.4, FIG. 1B). The obtained chlorine-free water is the main component of the following stage.

In the pretreatment plant, the chlorine free water is being filtered using micron filters/polishers. The first polisher is a 5μ polisher with 2 units. This polisher is used to remove particles with size ≥5 micron (3.1, FIG. 1C), and during this step, monitoring of differential pressure (ΔP≤1.0 bar) should be maintained in every shift. The second polisher is 1μ polisher with 2 units. This polisher is used to remove particles ≥1 micron (3.2, FIG. 1C), and during this step, monitoring of differential pressure (ΔP≤1.0 bar) should be maintained in every shift. Next, water passes through plate heat exchanger to reduce the temperature to a moderate level of 25-35° C. (3.3, FIG. 1C), this is usually done to increase the efficiency of the following reverse osmosis step. Sulfuric acid is further injected essentially at flow rate of 890-940 ml/H to maintain the pH below 7 (3.4, FIG. 1C).

To prevent scales formation at the reverse osmosis unit, an anti-scalant is injected at flow rate of 322 ml/h through specific dosing pump at the inlet of the reverse osmosis unit. This would in return increase the efficiency of reverse osmosis (3.5, FIG. 1C).

Figure 1C:
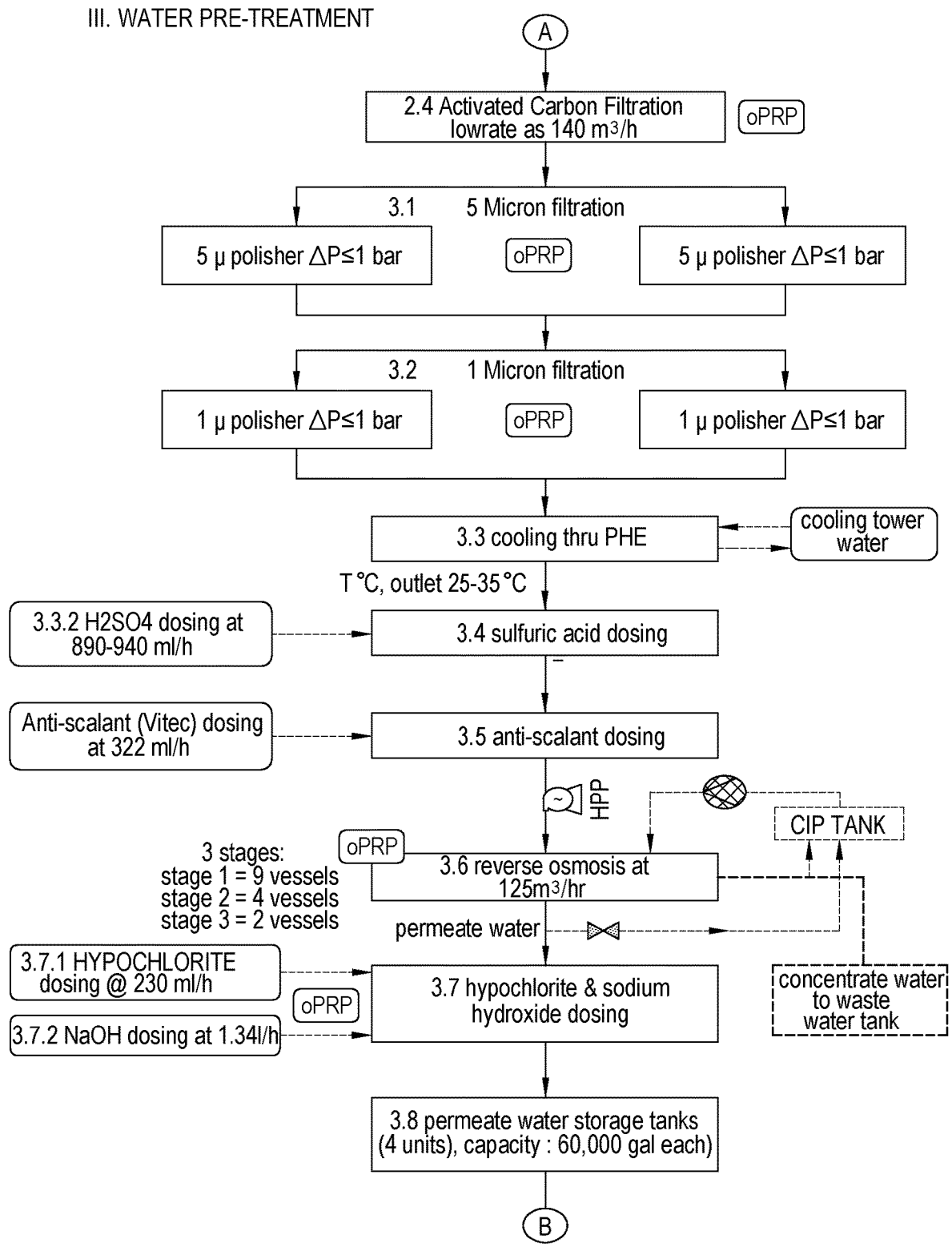

In the following step, the obtained water is entered into a reverse osmosis unit to reduce the total dissolved solids (TDS) of the raw water (FIG. 1C). The reverse osmosis membrane is particularly designed to reduce the bromide concentration along with the reduction of organic and inorganic materials. Reverse osmosis is carried out preferably by pumping water through highly pressurized motor pump to reverse osmosis at flow rate of 110±15 $m^3$/h. Reverse osmosis is usually carried out in 3 stages, the first stage composed of 9 membrane units, the second stage with 4 units, and the third stage with 2 units.

The permeate water resulting from each stage are combined as total permeate water with TDS <20 ppm (3.6, FIG. 1C). The resulted permeate is further injected with hypochlorite dosing at preferable flow rate of 210±20 ml/h, more preferably at 230 ml/h, with chlorine residual concentration of 0.15-0.30 ppm to ensure water disinfection hence avoid microbial growth (3.7.1, FIG. 1C). A dosing of sodium hydroxide is necessary to adjust the pH, so NaOH is injected at a preferable flow rate of 1.15±20 L/h, more preferably at 1.34 L/h to maintain pH balance above 7 and below 8 (3.7.2, FIG. 1C). Storage of the pre-treated water resulting from this stage is then stored at ambient temperature acting as buffer stock for post treatment process in the coming stage (3.8, FIG. 1C).

Figure 1D:
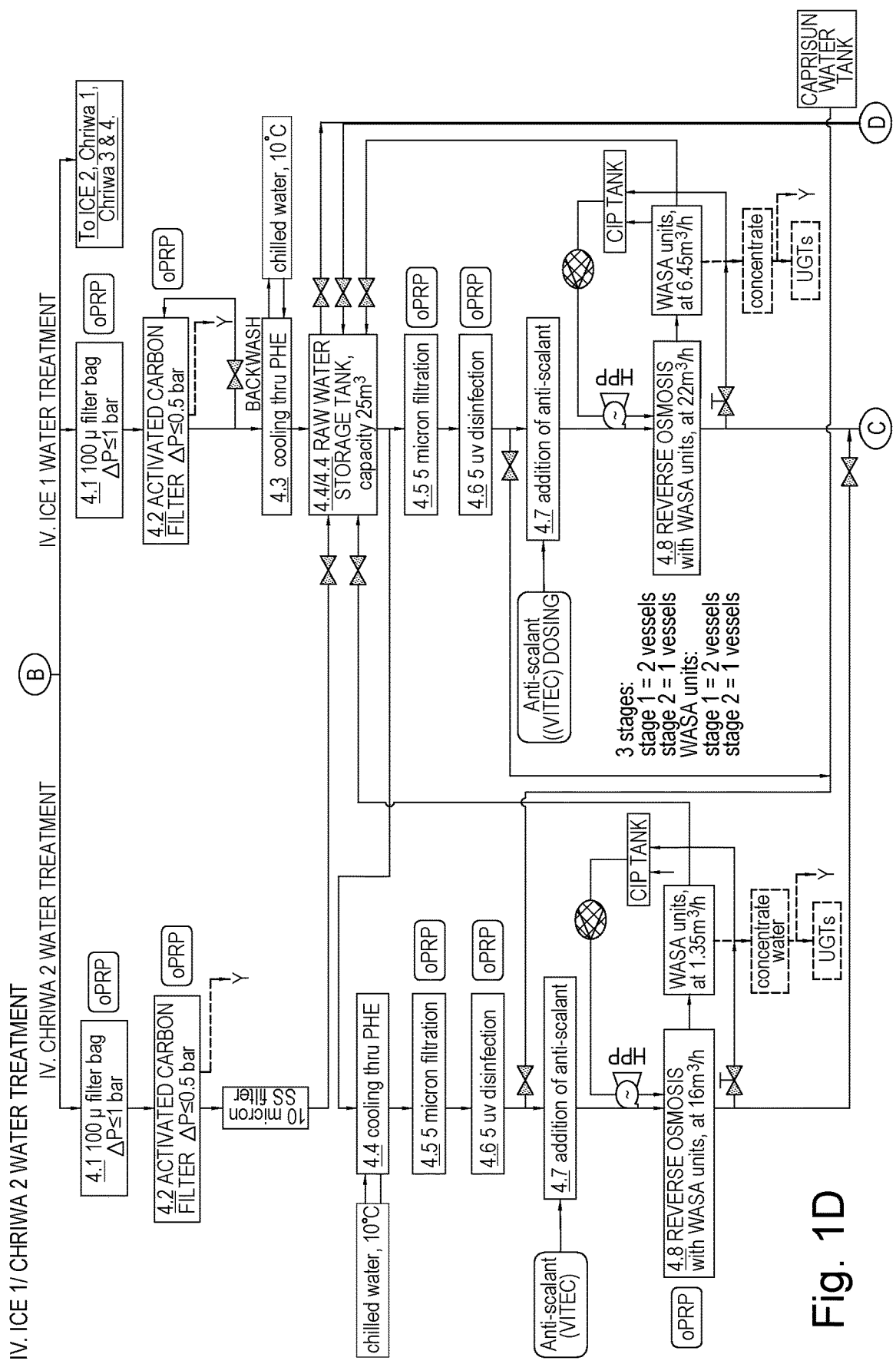
Figure 1E:
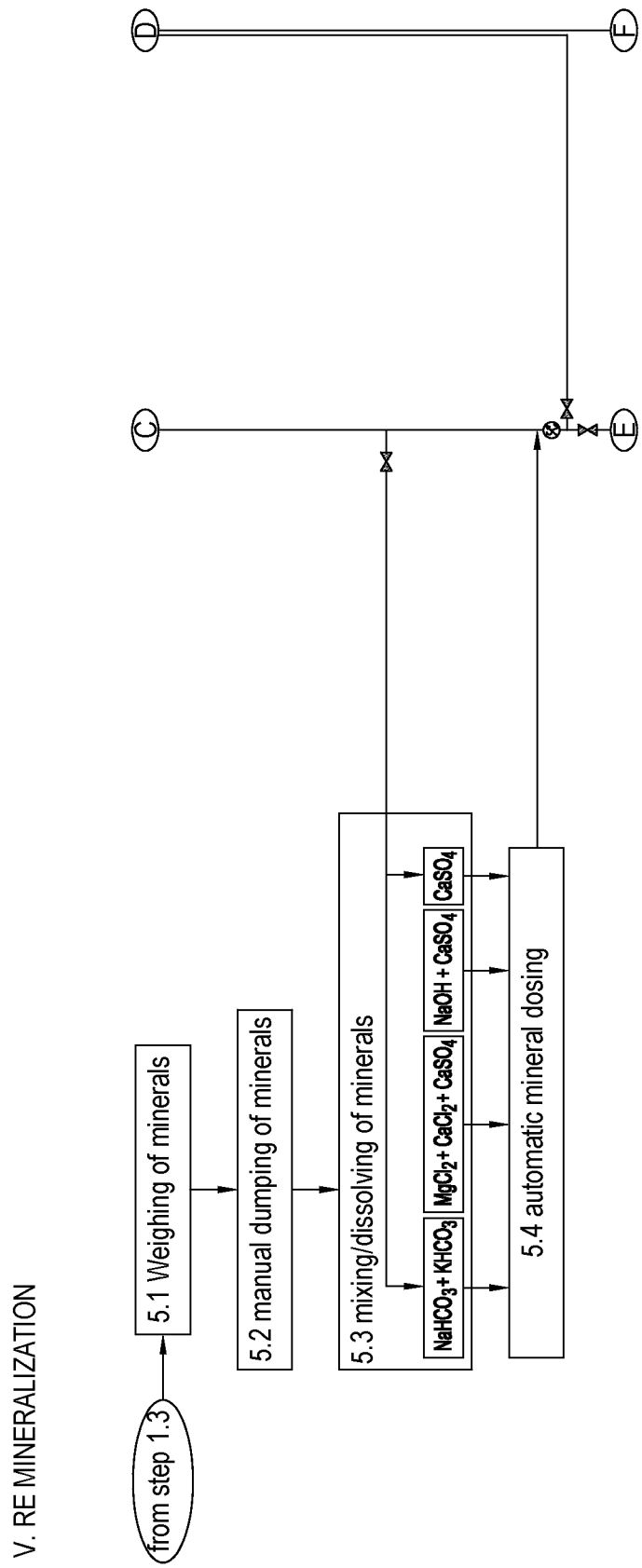

Post treatment of the pre-treated water is hence carried out in two subsequent stages; the first pretreatment process is through Chriwa 2 treatment, the second stage is carried out through ICE 1 treatment (steps 4, FIG. 1D). Post treatment of the pre-treated water will be explained in details in the following paragraphs.

Phase 1 of Post Treatment of the permeate water in the storage tank using the Chriwa water treatment technologies, comprises the steps of: bag filtration, active carbon filtration, cooling through PHE, micro filtration, UV disinfection, anti-scalant dosing, and reverse osmosis.

Bag filtration (4.1, FIG. 1D): which is carried out through transferring the permeate water by means of conveying motor at a pressure of 0.8 to 1.8 bar. The permeate water passes through 100 micron filter bag to remove foreign bodies of ≥100μ. The differential pressure should be monitored to be ≤1 bar to ensure good operational condition of filter and this acts as an indicator in case of the filter bag is clogged.

Active carbon filtration (4.2, FIG. 1D): in this step water passes through activated carbon filter at a differential pressure of ≤0.5 bar to remove the chlorine residue available in the water. The resulting chlorine free water is stored in raw water tank (common to ICE1) which is built with non-corrosive material, preferably of stainless steel material (4.3, FIG. 1D).

Cooling through PHE (4.4, FIG. 1D): in this step the permeate water obtained from active carbon filtration passes through plate heat exchanger (one stage cooling system, with an inlet cooling temperature of at least 10° C.) to reduce the temperature to 20-30° C.

Micro filtration (4.5, FIG. 1D): the cooled water passes through 5μ filter cartridge, at a differential pressure ≤1 bar to ensure good operational condition of the filter. The obtained water is hence free of particles of ≥5μ size.

UV disinfection (4.6, FIG. 1D): this step is essentially carried out to have water free of micro contamination, hence to protect the reverse osmosis membrane in the coming step from microorganism growth. This is carried out via passing water through UV unit.

Anti-scalant dosing (4.7, FIG. 1D): To prevent scales formation at the reverse osmosis unit, an anti-scalant is injected through specific dosing pump at the inlet of the reverse osmosis unit. This would in return increase the efficiency of reverse osmosis.

Reverse osmosis (4.8, FIG. 1D): In this step the obtained water is entered into a reverse osmosis unit to reduce the total dissolved solids (TDS) of water. Reverse osmosis is essentially carried out by pumping water through highly pressurized motor pump. Reverse osmosis is usually carried out in 3 stages, the first stage composed of 2 membranes, the second stage with 1 membrane, the permeates of each stage are collected as total permeate then mixed with the ICE1 permeate water. Reverse osmosis concentrate water will pass further through reverse osmosis using WASA unit of 1 membrane, and pumped to same raw water tank. The WASA concentrate will be collected and returned to storage tank for further treatment. The output water resulting from this step is of <5 ppm TDS.

Phase 2 of Post Treatment of the permeate water in the storage tank using the ICE 1 water treatment technologies comprises the steps of: bag filtration, active carbon filtration, cooling through PHE, micro filtration, UV disinfection, anti-scalant dosing, and reverse osmosis.

Bag filtration (4.1, FIG. 1D): which is carried out through transferring the permeate water by means of conveying motor at a pressure of 0.8 to 1.8 bar. The permeate water passes through 100 micron filter bag to remove foreign bodies ≥100μ. The differential pressure should be monitored to be ≤1 bar to ensure good operational condition of filter and this acts as an indicator in case of the filter bag is clogged.

Active carbon filtration (4.2, FIG. 1D): in this step water passes through activated carbon filter at a differential pressure of ≤0.5 bar to remove the chlorine residue available in the water.

Cooling through PHE (4.3, FIG. 1D): in this step the permeate water obtained from active carbon filtration passes through plate heat exchanger (one stage cooling system, with an inlet cooling temperature of at least 10° C. to reduce the temperature to 20-30° C.

Storage of raw water (4.4, FIG. 1D): cooled water is stored in aw water tank (Chriwa 2 water treatment). This tank is built with non-corrosive material, preferably from stainless steel material.

Micro filtration (4.5, FIG. 1D): water then passes through 5μ filter cartridge, at a differential pressure ≤1 bar to ensure good operational condition of filter. The obtained water is hence free of particles of ≥5μ size.

UV disinfection (4.6, FIG. 1D): this step is essentially carried out to have water free of micro contamination, hence to protect the reverse osmosis membrane in the coming step from microbial growth. This is carried out via passing water through UV unit.

Anti-scalant dosing (4.7, FIG. 1D): To prevent scales formation at the reverse osmosis unit, an anti-scalant is injected through specific dosing pump at the inlet of the reverse osmosis unit. This would in return increase the efficiency of reverse osmosis.

Reverse osmosis (4.8, FIG. 1D): In this step the obtained water is entered into a reverse osmosis unit to reduce the total dissolved solids (TDS) of water. Reverse osmosis is essentially carried out by pumping water through highly pressurized motor pump. Reverse osmosis is usually carried out in 3 stages, the first stage composed of 2 membranes, the second stage with 1 membrane, the permeates of each stage are collected as total permeate then mixed with the ICE1 permeate water. Reverse osmosis concentrate water will pass further through reverse osmosis using WASA unit of 1 membrane, and pumped to same raw water tank. The WASA concentrate will be collected and returned to storage tank for further treatment. The output water resulting from this step is of <5 ppm TDS.

The following step in the manufacturing of the vitamin D-fortified mineral water, in accordance with the present invention, is a re-mineralization step that comprises weighing minerals with standard concentrations (7.1, FIG. 1F), then dumping into mineral preparation tanks (7.2, FIG. 1F) to be mixed and dissolved. Furthermore, the mineral dosing is automatically added to the permeate water resulting from reverse osmosis stage (7.3, FIG. 1F). It is preferred that the mineral used in form of acceptable salts for example, but not limited to, Sodium bicarbonate, Potassium bicarbonate, Magnesium chloride, Calcium chloride, Calcium sulfate, Sodium hydroxide and/or mixtures thereof.

The mineralized solution is preferably passes through strainer to filter un-dissolved minerals and other un-dissolved particles during preparation.

The mineralized water is further subjected to ozone generator, going through 2 contact columns for the ozone to homogenously be mixed with water. The residual ozone monitored on line to have concentration between 0.20 and 0.25 ppm (6.1, FIG. 1F). The ozonation step is usually carried out to disinfect water after the mineralization process. This step is followed by storage of ozonated water in ICE1 storage tank (6.2, FIG. 1F)

The ozonated water obtained from the above-described steps is ready to be further mixed with the pre-weighed vitamin D and a mineral, e.g. calcium.

Figure 1F:
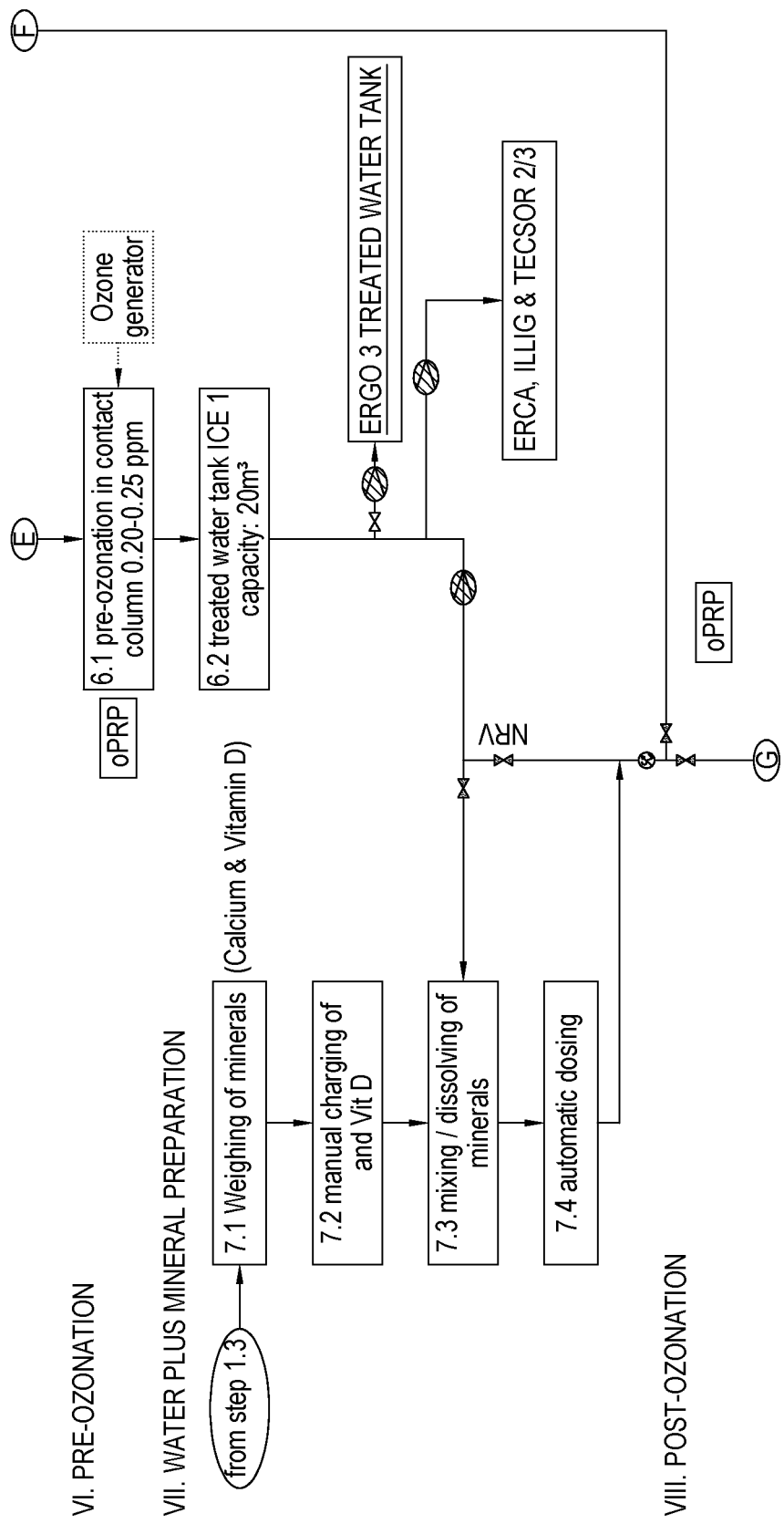

Calcium and vitamin D are weighed in calibrated weighing scale (7.1, FIG. 1F), then preferably manual dumping of the pre-weighed Calcium and vitamin D into the mineral preparation tanks is carried out (7.2, FIG. 1F).

Stock solution is prepared with the right concentration of vitamin D and calcium is then obtained via continuous agitation. (7.3, FIG. 1F).

Automatically, a dose is injected to the treated water line to achieve targeted concentration of vitamin D and calcium in the final product prior to filling step (7.4, FIG. 1F). In the embodiments of the present invention, it is a crucial to determine different control parameters to adjust the final desired concentration in the vitamin D-fortified mineral water. In some aspects, the method of the present invention provides a vitamin D-fortified drinking mineral water supplemented with calcium at a concentration of about 10 μg/ml, about 20 μg/ml, about 30 μg/ml, about 40 μg/ml, about 50 μg/ml, about 60 μg/ml, about 70 μg/ml, about 80 μg/ml, about 90 μg/ml, or about 100 μg/ml. In a preferred aspect, calcium is added at about 60 μg/ml. A skilled person in the art appreciates that calcium can be added at a different concentration according and in view of local, international, and different industry standards. In some aspects, vitamin D dosing is preferably carried out simultaneously with calcium dosing. In other aspects, vitamin D dosing is preferably carried out consecutively with calcium dosing. In some aspects of the invention, vitamin D dosing is preferably carried out simultaneously with other minerals dosing. In other aspects of the invention, vitamin D dosing is preferably carried out consecutively with other minerals dosing. In some aspects, vitamin D dosing is preferably carried out consecutively with calcium and other minerals dosing.

In water production, processes are necessary to produce a consistent and safe product including but not limited to filtration and disinfection stages. However such steps in the process may impact the added vitamin D in the process and affect the initial dosage. As such, inventors are able to determine the right initial dosage (stock solution) and implement the right processes to get the declared amount of vitamin D in the finished product (0.1 IU/ml). In accordance of the present invention, the control of vitamin D level during manufacturing, wherein about 50% loss of vitamin D was estimated during production mainly due to the impact of ozone used to disinfect the water and the line of production in addition to the degradation percentages of vitamin D during production and during the shelf life. Therefore, a matrix was established which takes in consideration the strock length of dosing pump to match the respective flow rate of water in the filling stage; this matrix identifies the right amount of vitamin D that needs to be added in the dosing tank to reach the declared amount on the label with the acceptable tolerance (+50% and −35%): 1) strock length of the dosing pump, 2) flow rate of water in the line, and 3) amount of vitamin D to be dosed (see Examples). In addition, the levels of ozone have been set between 0.20 and 0.25 ppm to disinfect the water and the line of production. In the present invention, the control parameters and the determination of the right amount of vitamin D to be dosed (to get the declared amount for vitamin D within the acceptable tolerance) ensured the repeatability and the consistency during production of the vitamin D-fortified mineral water (see FIGS. 2-3).

In accordance with another aspect of the invention, the vitamin D-fortified mineral drinking water according to the preset invention is filled in suitable containers to ensure the stability of vitamin D content. The containers are essentially PET containers, preferably PET bottles with UV-barrier/scavenger materials. In some embodiments, the UV scavenger is a mixture of:

d) polyethylene glycol (EO=1-30, typically 5) ether of butyl 2-cyano 3-(4-hydroxy-3-methoxyphenyl) acrylate [at concentration >=50%];

e) 2,2-(1,4-phenylene)bis((4H-3,1-benzoxazine-4-one) [at concentration of 10-25%]; and f) C.I. Solvent Violet 13 [at concentration of 0.1-1%]

In other embodiments, a skilled one in the art can foresee from the present invention different concentrations and mixtures to act as a UV-barrier/scavenger to protect and hence enhance the stability of vitamin D.

Figure 1G:
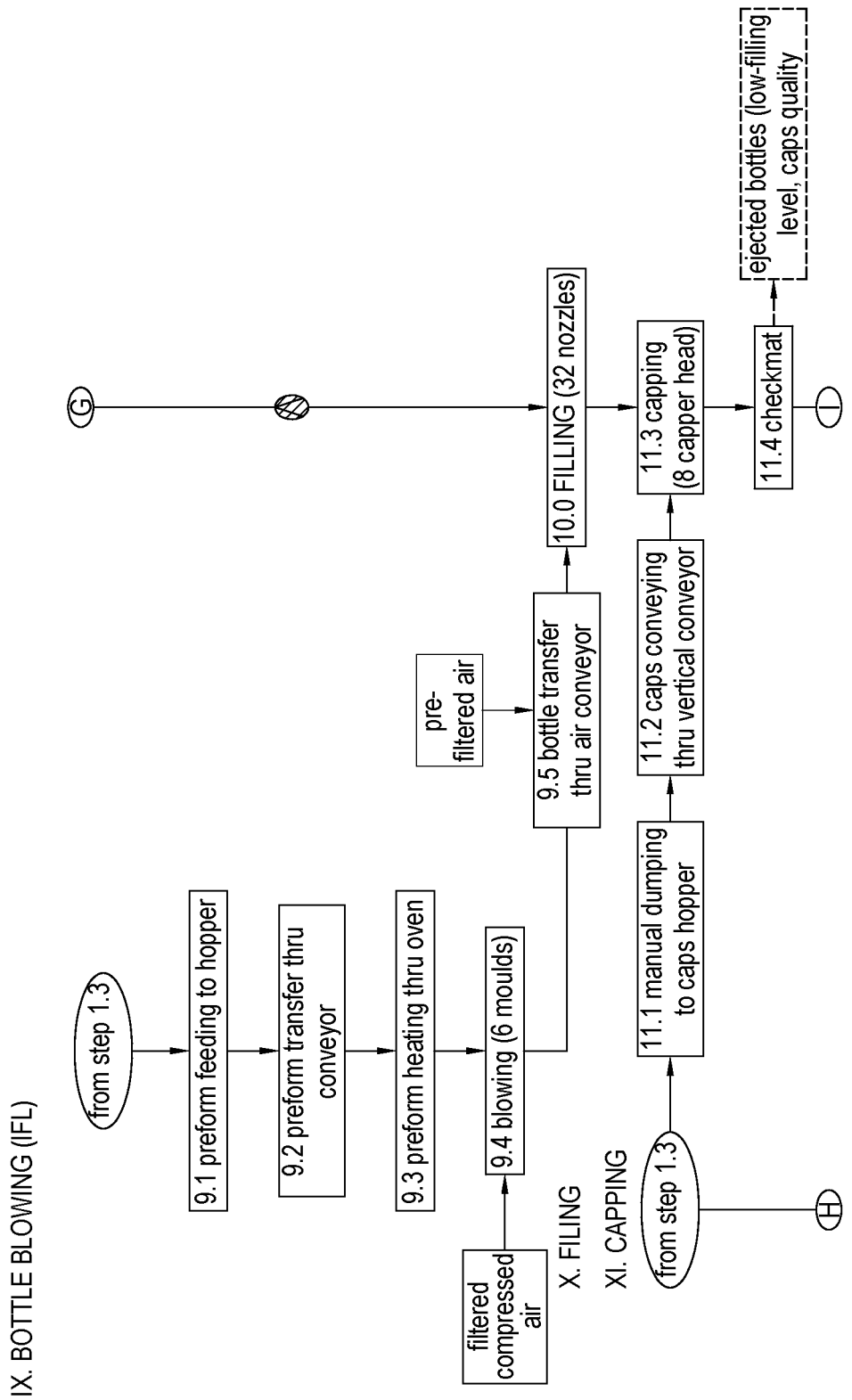
Figure 1H:
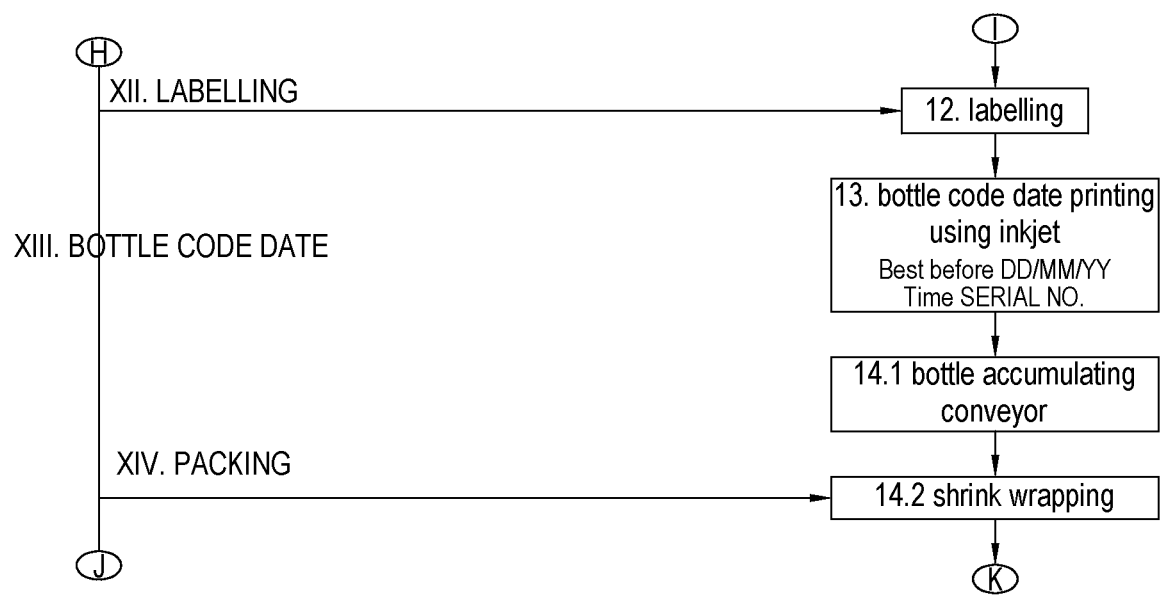
Figure 1I:
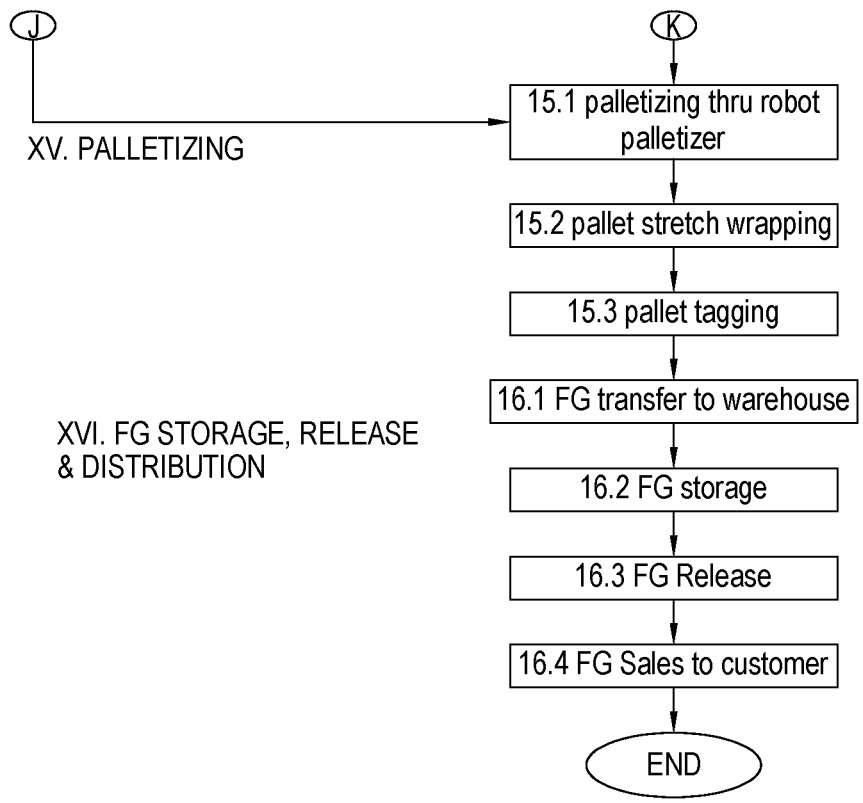

PET containers preform feeding using battery-operated lifted as per production requirement, e.g. hourly dumped by means of dumper to the hopper (9.1, FIG. 1G) then preheated via oven to be ready for blowing (9.3, FIG. 1G).

The performs are transferred to a blowing station, wherein the mold is closed and locked. The heated preforms are blow-molded into the desired shape with the stretching rod and blowing air. Blowing consist of pre-blowing (7 bar) and final blowing (20 bar) with 6 blowing molds (9.4, FIG. 1G).

In accordance with still another aspect of the invention, the vitamin D-fortified mineral drinking water is filled into the blown containers. In other aspects, storage of the final product takes place at below 30° C.

In different embodiments, the method of the present invention provides vitamin D has a particle size of less than about 1000 μm, less than about 950 μm, less than about 900 μm, less than about 850 μm, less than about 800 μm, less than about 750 μm, less than about 700 μm, less than about 650 μm, less than about 600 μm, less than about 550 μm, or less than about 500 μm.

In some embodiments, vitamin D may have a mixture of different particle sizes. In some embodiments, at least about 90% of vitamin D particles have size of less than about 500 μm, less than about 475 μm, less than about 450 μm, less than about 425 μm, less than about 400 μm, less than about 375 μm, less than about 350 μm, less than about 325 μm, less than about 300 μm, less than about 275 μm, less than about 250 μm, less than about 225 μm, or less than about 200 μm. In some embodiments, at least about 80% of vitamin D particles have size of less than about 500 μm, less than about 475 μm, less than about 450 μm, less than about 425 μm, less than about 400 μm, less than about 375 μm, less than about 350 μm, less than about 325 μm, less than about 300 μm, less than about 275 μm, less than about 250 μm, less than about 225 μm, or less than about 200 μm. In some embodiments, at least about 70% of vitamin D particles have size of less than about 500 μm, less than about 475 μm, less than about 450 μm, less than about 425 μm, less than about 400 μm, less than about 375 μm, less than about 350 μm, less than about 325 μm, less than about 300 μm, less than about 275 μm, less than about 250 μm, less than about 225 μm, or less than about 200 μm. In some embodiments, at least about 60% of vitamin D particles have size of less than about 500 μm, less than about 475 μm, less than about 450 μm, less than about 425 μm, less than about 400 μm, less than about 375 μm, less than about 350 μm, less than about 325 μm, less than about 300 μm, less than about 275 μm, less than about 250 μm, less than about 225 μm, or less than about 200 μm. In some embodiments, at least about 50% of vitamin D particles have size of less than about 500 μm, less than about 475 μm, less than about 450 μm, less than about 425 μm, less than about 400 μm, less than about 375 μm, less than about 350 μm, less than about 325 μm, less than about 300 μm, less than about 275 μm, less than about 250 μm, less than about 225 μm, or less than about 200 μm.

In some embodiments, the method of the present invention provides up to about 25% of vitamin D particles have size of less than about 250 μm, less than about 225 μm, less than about 200 μm, less than about 175 μm, less than about 150 μm, less than about 125 μm, less than about 100 μm, less than about 75 μm, less than about 50 μm, or less than about 25 μm. In some embodiments, up to about 20% of vitamin D particles have size of less than about 250 μm, less than about 225 μm, less than about 200 μm, less than about 175 μm, less than about 150 μm, less than about 125 μm, less than about 100 μm, less than about 75 μm, less than about 50 μm, or less than about 25 μm. In some embodiments, up to about 15% of vitamin D particles have size of less than about 250 μm, less than about 225 μm, less than about 200 μm, less than about 175 μm, less than about 150 μm, less than about 125 μm, less than about 100 μm, less than about 75 μm, less than about 50 μm, or less than about 25 μm. In some embodiments, up to about 10% of vitamin D particles have size of less than about 250 μm, less than about 225 μm, less than about 200 μm, less than about 175 μm, less than about 150 μm, less than about 125 μm, less than about 100 μm, less than about 75 μm, less than about 50 μm, or less than about 25 μm. In some embodiments, up to about 5% of vitamin D particles have size of less than about 250 μm, less than about 225 μm, less than about 200 μm, less than about 175 μm, less than about 150 μm, less than about 125 μm, less than about 100 μm, less than about 75 μm, less than about 50 μm, or less than about 25 μm.

In some embodiments, the vitamin D-fortified drinking water has total dissolved solids in the range of 252.5 to 277.5 mg/L and turbidity <5 NTU. In some embodiments, the vitamin D-fortified drinking water has total dissolved solids of about 100 mg/l, about 200 mg/l, about 300 mg/l, about 400 mg/l, about 500 mg/l, about 600 mg/l, about 700 mg/l, about 800 mg/l, about 900 mg/l, or about 1000 mg/l. Other ranges of total dissolved solids can be produced depending on the levels allowed by local, regional and international standards. In other aspects, vitamin D-fortified drinking water has a pH between about 6.5 and about 8. A skilled person in the art appreciates and knows that this pH range can be different in view of local, international, and different industry standards.

EXAMPLES

Example 1: Trials to Reach the Desired Dosage of Vitamin D

1. Objective

The objective is to identify the right percentage of dosing for vitamin D3 in the dosing tank to reach the desired dosage in the final product which is 50 IU (International Unit)/500 ml; the acceptable tolerance levels can be between 32.5 and 75 IU/500 ml based on the acceptable tolerances in foods including the uncertainty of measurement (+50% and −35% as per Guidance Document for Competent Authorities for the Control of Compliance With EU Legislation on: Regulation (EU) No 1169/2011 of the European Parliament and of the Council of 25 Oct. 2011). As such the acceptable levels of vitamin D3 in the finished product can vary between 32.5 IU and 75 IU per 500 ml.

2. Material and Methods 2.1 Vitamin D3 Dosing

A 50% loss of vitamin D3 was estimated during production mainly due to the impact of ozone used to disinfect the water and the line of production. Taking in consideration the degradation percentages of vitamin D3 during production and during the shelf life, four dosing levels have been used in four trials. The levels of dosing were calculated taking in consideration the final amount of vitamin D 3 to be within the acceptable tolerance mentioned above. Moreover the dosing rate of the pump and the water flow has been considered. Vitamin D3 was added in the dosing tank with calcium.

TABLE 1

Main process parameters for vitamin D3 dosing

| Trial | Target Vitamin D3/ 500 mL (as final product) after 50% loss in production | Dosing Rate (L/h) | Water flow (L/h) | Vitamin D (Kg/400 L) |
|---|---|---|---|---|
| 1a | 60 | 74.9 | 5,300 | 0.06793 |
| 1b | 70 | 74.9 | 5,300 | 0.07925 |

TABLE 1-continued

Main process parameters for vitamin D3 dosing

| Trial | Target Vitamin D3/ 500 mL (as final product) after 50% loss in production | Dosing Rate (L/h) | Water flow (L/h) | Vitamin D (Kg/400 L) |
|---|---|---|---|---|
| 1c | 80 | 74.9 | 5,300 | 0.09057 |
| 1d | 90 | 74.9 | 5,300 | 0.10190 |

In addition an Ultra Violet (UV) lamp is before the filling step in the process. This UV was turned off in the last 30 minutes of each trial to assess the impact of this UV lamp on the vitamin D3 retention.

2.2 Vitamin D3

Vitamin D3 molecule used is dispersible in water and protected by sucrose, gum Arabic, corn starch tricalcium phosphate and a tocopherol (details in the specification).

2.3 Water

The water used to produce Vitamin D has the following chemical composition:

TABLE 2

Chemical composition of water

| Parameters | Unit | AAFB Standard |
|---|---|---|
| pH | — | 6.5 to 8.0 |
| Conductivity | μs/cm | 530 ± 25 |
| Total Dissolved Solids | mg/L | 265 ± 12.5 |
| Calcium | mg/L | 60.00 ± 10.00 |
| Magnesium | mg/L | 13.00 ± 2.00 |
| Chloride | mg/L | 140.00 ± 30.00 |
| Bromate $BrO_3$ | mg/L | <10 ppb |
| Nitrate | mg/L | <0.30 |
| Sulfate | mg/L | 5.00 ± 2.00 |
| Sodium | mg/L | 8.00 ± 2.00 |
| Potassium | mg/L | 2.00 ± 1.00 |
| Bicarbonate | mg/L | 22.00 ± 5 |

2.4 Analysis of Vitamin D3 in Water

Vitamin D3 was analyzed by Campden BRI (Gloucestershire, United Kingdom) using the high performance liquid chromatography LC/MS/MS. The method used to identify Vitamin D3-cholecalciferol is TERS-AC-778, for the single extraction of the vitamin D from the food matrix by alkaline hydrolysis; it was followed by solvent partition and concentration for vitamin D3.

2.5 Trial Duration and Testing Plan

TABLE 3

Sampling plan

| Duration for each dosing level | Testing frequency | Target parameters |
|---|---|---|
| 2 hours | At start and every 1 hour At start and every 30 min | 1. Chemical composition 2. Vitamin D |

3. Results and Discussion:

The levels of vitamin D3 in the final products in the four trials were 28, 34.8, 37 and 40.2 IU respectively in trial 1, 2, 3, and 4. The percentages of retention varied between 22% and 25%. However, in all mentioned trials, the UV lamp was on before filling. The detailed values of vitamin D3 in the final products and its retention levels are summarized in Table 4.

TABLE 4

Vitamin D3 results from different dosing levels of vitamin D3 with the usage of the UV lamp before filler.

| Sample tested/ code/Trial | Laboratory results µg Cholecalciferol/ 100 g * | Levels of Vitamin D3 IU/500 mL | Initial Dosage (in the dosing tank) IU/ 500 ml | % of recuperation of Vitamin D3 in the final product |
|---|---|---|---|---|
| 1A 14:45 sample code/1 | 0.130 | 26 | 120 | 22% |
| 1A 14:45 sample code/1 | 0.130 | 26 | 120 | 22% |
| 1A 15:15 sample code/1 | 0.150 | 30 | 120 | 25% |
| 1A 15:15 sample code/1 | 0.170 | 34 | 120 | 28% |
| 1A 15:45 sample code/1 | 0.130 | 26 | 120 | 22% |
| 1A 15:45 sample code/1 | 0.120 | 24 | 120 | 20% |
| 1A 16:25 sample code/1 | 0.120 | 24 | 120 | 20% |
| 1A 16:25 sample code/1 | 0.120 | 24 | 120 | 20% |
| Average | 0.138 | 28 | 120 | 23.3% |
| Standard deviation | 0.019 | 4 | NA | 3.3% |
| 1B 9:30 sample code/2 | 0.190 | 38 | 140 | 27% |
| 1B 9:30 sample code/2 | 0.190 | 38 | 140 | 27% |
| 1B 10:00 sample code/2 | 0.170 | 34 | 140 | 24% |
| 1B 10:00 sample code/2 | 0.160 | 32 | 140 | 23% |
| 1B 10:30 sample code/2 | 0.160 | 32 | 140 | 23% |
| 1B 10:30 sample code/2 | 0.160 | 32 | 140 | 23% |
| 1B 11:00 sample code/2 | 0.180 | 36 | 140 | 26% |
| 1B 11:00 sample code/2 | 0.180 | 36 | 140 | 26% |
| Average | 0.174 | 34.8 | 140 | 25% |
| Standard deviation | 0.0130 | 2.6 | NA | 1.85% |
| 1C 12:45 sample code/3 | 0.170 | 34 | 160 | 21% |
| 1C 12:45 sample code/3 | 0.170 | 34 | 160 | 21% |
| 1C 1:15 sample code/3 | 0.170 | 34 | 160 | 21% |
| 1C 1:15 sample code/3 | 0.170 | 34 | 160 | 21% |
| 1C 1:45 sample code/3 | 0.200 | 40 | 160 | 25% |
| 1C 1:45 sample code/3 | 0.170 | 34 | 160 | 21% |
| 1C 2:15 sample code/3 | 0.180 | 36 | 160 | 23% |
| 1C 2:15 sample code/3 | 0.250 | 50 | 160 | 31% |
| Average | 0.185 | 37 | 160 | 23% |
| Standard deviation | 0.028 | 5.6 | NA | 3.5% |
| 1D 17:30 sample code/4 | 0.150 | 30 | 180 | 17% |
| 1D 17:30 sample code/4 | 0.200 | 40 | 180 | 22% |
| 1D 18:00 sample code/4 | 0.200 | 40 | 180 | 22% |
| 1D 18:00 sample code/4 | 0.180 | 36 | 180 | 20% |
| 1D 18:30 sample code/4 | 0.190 | 38 | 180 | 21% |
| 1D 18:30 sample code/4 | 0.210 | 42 | 180 | 23% |
| 1D 19:00 sample code/4 | 0.210 | 42 | 180 | 23% |
| 1D 19:00 sample code/4 | 0.270 | 54 | 180 | 30% |
| Average | 0.201 | 40.2 | 180 | 22.3% |
| Standard deviation | 0.033 | 6.6 | NA | 3.6% |

The levels of vitamin D3 in the final products in the four trials (where UV lamp was off before filling) were 31, 47, 52 and 96 IU respectively in trial 1, 2, 3, and 4. The percentages of retention varied between 26% and 53.3%. The detailed values of vitamin D3 in the final products and its retention levels are summarized in Table 5.

TABLE 5

Vitamin D3 results in final products from different dosing levels of vitamin D3 without the usage of the UV lamp before filler.

| Sample tested/ code/ Trial | Laboratory results µg Cholecalciferol 100 g | Levels of Vitamin D3 IU/500 mL | Dosage of vitamin D3 (in the dosing tank) IU/500 ml | % of recuperation of Vitamin D3 in the final product |
|---|---|---|---|---|
| 1A 16:45 sample code/1 | 0.170 | 34 | 120 | 28% |
| 1A 16:45 sample code/1 | 0.140 | 28 | 120 | 23% |
| Average | 0.155 | 31 | 120 | 26 |
| Standard deviation | 0.021 | 4.2 | | 3.5 |
| 1B 11:30 sample code/2 | 0.250 | 50 | 140 | 36% |
| 1B 11:30 sample code/2 | 0.220 | 44 | 140 | 31% |
| Average | 0.235 | 47 | 140 | 33.5 |
| Standard deviation | 0.021 | 4.2 | | 3 |
| 1C 2:45 sample code/3 | 0.270 | 54 | 160 | 34% |
| 1C 2:45 sample code/3 | 0.250 | 50 | 160 | 31% |
| Average | 0.260 | 52 | 160 | 32.5 |
| Standard deviation | 0.04 | 2.8 | | 1.75 |
| 1D 19:30 sample code/4 | 0.450 | 90 | 180 | 50% |
| 1D 19:30 sample code/4 | 0.510 | 102 | 180 | 57% |
| Average | 0.48 | 96 | 180 | 53.3 |
| Standard deviation | 0.04 | 8 | | 4.4 |

It's clear that the UV lamp before filling has a significant impact on the levels of vitamin D3 in the final product and on the degradation of vitamin D3 during production. On the other hand, the recuperation level of vitamin D3 is also increasing with the increase of the dosing levels within the same conditions of production (e.g. UV lamp turned off).

On another note, it's clear that the dosing system is consistent in all trials with and without usage of the UV lamp and the control measure implemented in the line has reached to the consistency in real production.

4. Conclusions and Recommendations for the Trials

It has been concluded that the levels of recuperation of vitamin D3 are higher in the trials conducted without the usage of the UV lamp before the filler. Also, the consistency of the levels of vitamin D3 in the final products have been reached because of the appropriate control measures implemented in the line, specifically for the flow rate and the dosing rate of the dosing unit.

However, as the target level of vitamin D3 in the final product should be 50 IU500 ml with the following tolerances (+50% and −35%), it has been recommended to dose 172 IU/500 ml with an estimation of 43% of recuperation of this concentration and without the usage of UV lamp. This value is the average of the trial 3 and trial 4 without the usage of UV lamp (Table 5).

5. Commercial Batch

Since a commercial batch was manufactured in Jan. 2, 2018, the results of the final products are within the acceptable tolerances which confirmed that the recommended level of dosage was appropriate. Also the consistency of production has been confirmed. Levels of vitamin D3 in the final products from the commercial productions are summarized in Table 6 and in FIGS. 2 and 3.

TABLE 6

Results of Vitamin D3 in Final Product in the Commercial Batch

| Sample. Number | Best before | Volume | Laboratory Results in IU |
|---|---|---|---|
| 3 | 04/07/18 | 500 ml | 53.46 |
| 4 | 07/07/18 | 330 ml | 34.89 |
| 5 | 29/07/18 | 330 ml | 34.5 |
| 6 | 30/07/18 | 330 ml | 34.89 |
| 7 | 30/07/18 | 330 ml | 34.11 |
| 8 | 01/08/18 | 330 ml | 34.5 |
| 9 | 01/08/18 | 330 ml | 34.63 |
| 10 | 02/08/18 | 500 ml | 52.47 |
| 11 | 02/08/18 | 500 ml | 52.07 |
| 12 | 02/08/18 | 500 ml | 52.47 |
| 13 | 03/08/18 | 500 ml | 52.27 |
| 14 | 03/08/18 | 500 ml | 51.88 |
| 15 | 03/08/18 | 500 ml | 51.48 |
| 16 | 04/08/18 | 500 ml | 53.06 |
| 17 | 04/08/18 | 500 ml | 51.88 |
| 18 | 04/08/18 | 500 ml | 51.68 |
| 19 | 04/08/18 | 500 ml | 52.07 |
| 20 | 05/08/18 | 500 ml | 51.48 |
| 21 | 05/08/18 | 500 ml | 51.68 |
| 22 | 05/08/18 | 500 ml | 51.28 |
| 23 | 05/08/18 | 500 ml | 51.28 |
| 24 | 06/08/18 | 500 ml | 52.07 |
| 25 | 06/08/18 | 500 ml | 51.68 |
| 26 | 06/08/18 | 500 ml | 51.48 |
| 27 | 07/08/18 | 330 ml | 34.24 |
| 28 | 07/08/18 | 330 ml | 33.98 |
| 29 | 08/08/18 | 330 ml | 34.24 |
| 30 | 08/08/18 | 330 ml | 34.24 |
| 31 | 08/08/18 | 330 ml | 34.37 |
| 32 | 09/08/18 | 330 ml | 34.11 |
| 33 | 09/08/18 | 330 ml | 34.37 |
| 34 | 09/08/18 | 330 ml | 33.98 |
| 35 | 10/08/18 | 330 ml | 34.76 |
| 36 | 10/08/18 | 330 ml | 34.76 |
| 37 | 11/08/18 | 330 ml | 34.24 |
| 38 | 11/08/18 | 330 ml | 35.15 |
| 39 | 13/08/18 | 330 ml | 33.72 |
| 40 | 13/08/18 | 330 ml | 33.58 |
| 41 | 14/08/18 | 500 ml | 51.48 |
| 42 | 14/08/18 | 500 ml | 53.26 |
| 43 | 15/08/18 | 500 ml | 51.88 |
| 44 | 15/08/18 | 500 ml | 52.27 |
| 45 | 15/08/18 | 500 ml | 52.27 |
| 46 | 15/08/18 | 500 ml | 52.07 |
| 47 | 16/08/18 | 500 ml | 53.26 |
| 48 | 16/08/18 | 500 ml | 53.06 |
| 49 | 16/08/18 | 500 ml | 53.26 |
| 50 | 16/08/18 | 500 ml | 51.68 |
| 51 | 17/08/18 | 500 ml | 52.07 |
| 52 | 17/08/18 | 500 ml | 52.27 |
| 53 | 17/08/18 | 500 ml | 53.06 |
| 54 | 18/08/18 | 500 ml | 52.87 |
| 55 | 18/08/18 | 500 ml | 53.46 |
| 56 | 19/08/18 | 330 ml | 34.37 |
| 57 | 20/08/18 | 330 ml | 34.76 |
| 58 | 20/08/18 | 330 ml | 34.76 |
| 59 | 20/08/18 | 330 ml | 34.24 |
| 60 | 21/08/18 | 330 ml | 34.76 |
| 61 | 21/08/18 | 330 ml | 34.76 |
| 62 | 22/08/18 | 330 ml | 33.19 |
| 63 | 28/08/18 | 500 ml | 52.87 |
| 64 | 28/08/18 | 500 ml | 51.88 |
| 65 | 28/08/18 | 500 ml | 53.06 |
| 66 | 28/08/18 | 500 ml | 52.87 |
| 67 | 28/08/18 | 500 ml | 52.27 |
| 68 | 28/08/18 | 500 ml | 51.88 |
| 69 | 28/08/18 | 500 ml | 53.26 |
| 70 | 05/09/18 | 330 ml | 34.37 |
| 71 | 06/09/18 | 330 ml | 34.24 |

TABLE 7

Results of Vitamin D3 in Final Product in other Commercial Batches

| S/N | Best Before | Time | SKU's | Unit | Efrac_Results |
|---|---|---|---|---|---|
| 1 | 02.07.18 | 1D 10:14 sample code | 500 ml | IU | 57.02 |
| 2 | 02.07.18 | 1D 15:22 sample code | 500 ml | IU | 58.81 |
| 3 | 02.07.18 | 1D 23:22 sample code | 500 ml | IU | 59.00 |
| 4 | 03.07.18 | 1D 06:32 sample code | 500 ml | IU | 56.43 |
| 5 | 03.07.18 | 1D 15:03 sample code | 500 ml | IU | 59.2 |
| 6 | 03.07.18 | 1D 23:11 sample code | 500 ml | IU | 57.42 |
| 7 | 04.07.18 | 1D 07:04 sample code | 500 ml | IU | 56.83 |
| 8 | 04.07.18 | 1D 15:02 sample code | 500 ml | IU | 56.23 |
| 9 | 04.07.18 | 1D 23:15 sample code | 500 ml | IU | 57.62 |
| 10 | 05.07.18 | 1D 06:59 sample code | 500 ml | IU | 56.83 |
| 11 | 05.07.18 | 1D 15:02 sample code | 330 ml | IU | 37.77 |
| 12 | 05.07.18 | 1D 23:59 sample code | 330 ml | IU | 37.9 |
| 13 | 06.07.18 | 1D 07:04 sample code | 330 ml | IU | 38.55 |
| 14 | 06.07.18 | 1D 15:00 sample code | 330 ml | IU | 38.68 |
| 15 | 06.07.18 | 1D 23:16 sample code | 330 ml | IU | 36.98 |
| 16 | 07.07.18 | 1D 07:10 sample code | 330 ml | IU | 37.11 |

TABLE 7-continued

Results of Vitamin D3 in Final Product in other Commercial Batches

| S/N | Best Before | Time | SKU's | Unit | Efrac_Results |
|---|---|---|---|---|---|
| 17 | 07.07.18 | 1D 15:15 sample code | 330 ml | IU | 37.51 |
| 18 | 08.07.18 | 1D 07:10 sample code | 330 ml | IU | 38.03 |

Example 2: Packaged Vitamin D-Fortified Mineral Water has a Long Shelf-Life of Up to 5 Months A vitamin D-fortified mineral water was manufactured according to the embodiments of the present invention and packaged in PET/UV-barrier bottles to access the stability of vitamin D Table 8 shows that the present invention is able to protect the vitamin D in clear PET/UV-barrier bottles for 5 months at 30° C.; the level of the declared vitamin D was within the acceptable tolerance limits.

By adding UV barrier chemicals in PET bottles, by using specific vitamin D3 molecule dispersible in water and protected by sucrose, gum Arabic, corn starch, tricalcium phosphate, MCT oil, and a tocopherol, the present invention have ensured to maintain the declared amount during storage at 30° C. for 5 months.

TABLE 8

Vitamin D shelf life study at 30° C.

| Week | μg/100 ml | IU/500 ml | tolerance 32.5 IU-75 IU |
|---|---|---|---|
| 1 | Below detection limit | <100 IU/liter | NA |
| 8 | 0.15 | 30 | |
| 11 | 0.25 | 50 | |
| 13 | 0.24 | 48 | |
| 15 | 0.16 | 32 | |
| 17 | 0.16 | 32 | |
| 19 | 0.18 | 36 | |

EQUIVALENTS

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

Those skilled in the art will recognize, or be able to ascertain, using no more than routine experimentation, numerous equivalents to the specific embodiments described specifically herein. Such equivalents are intended to be encompassed in the scope of the following claims.

As used herein, all headings are simply for organization and are not intended to limit the disclosure in any manner. The content of any individual section may be equally applicable to all sections.

The invention claimed is:

1. A drinking product, comprising water fortified with a vitamin-D composition in a UV-barrier package; wherein the drinking product is a dietary supplement, wherein the drinking product has a shelf life of at least about 5 months, wherein the vitamin-D composition has a particle size of less than about 1000 μm, and wherein the UV barrier package is essentially made from polyethylene terephthalate with a UV-scavenger.

2. The drinking product of claim 1, wherein vitamin D is selected from the group consisting of vitamin D2, vitamin D3, and mixtures thereof.

3. The drinking product of claim 1, wherein vitamin D is dispersible in water.

4. The drinking product of claim 1, wherein water is the carrier of vitamin D.

5. The drinking product of claim 1, wherein the vitamin D-fortified water has no natural or artificial sweeteners, sugars, colorants, flavors, or preservatives.

6. The drinking product of claim 1, comprising vitamin D in the range of 0.07 to 0.15 IU/ml.

7. The drinking product of claim 1, wherein the drinking product has a pH between about 6.5 and about 8.

8. The drinking product of claim 1, further comprising a mineral, wherein the mineral is at least one mineral selected from the group consisting of sodium, potassium, magnesium, calcium and/or acceptable salts and mixtures thereof.

9. The drinking product of claim 1, wherein the water is mineral water.

10. The drinking product of claim 9, wherein the mineral water is spring water or well water.

11. The drinking product of claim 1, comprising at least about 0.1 IU of vitamin D per ml of the drinking product.

12. The drinking product of claim 1, further comprising added calcium.

13. The drinking product of claim 1, wherein the package is in the form of a can or bottle or any other packaging form.

14. The drinking product of claim 1, wherein the drinking product, has no metallic taste or aftertaste, and wherein no flavors, sweeteners, colorant or preservative have been added to the drinking product.

15. The drinking product of claim 1, wherein at least 50% of vitamin-D particles have a size of less than about 500 μm.

16. The drinking product of claim 1, wherein the UV-scavenger is selected from the group consisting of: polyethylene glycol, 2,2-(1,4-phenylene)bis(4H-3,1-benzoxazine-4-one), 1-Hydroxy-4-(4-methylanilino)anthracene-9,10-dione and combinations thereof.

17. A method of preparing a drinking product, comprising:
   treating water to remove particles, chlorine, reduce reduce total dissolved solids (TDS), and to prevent microbial growth;
   re-mineralizing the treated water to maintain concentration of minerals in the treated water;
   ozoning the treated water to disinfect the treated water after re-mineralization;
   preparing a stock solution of vitamin D composition with a calculated concentration of dispersible vitamin D required to reach desired dose of vitamin D in final drinking product;
   adjusting required control steps to reach the desired dose of vitamin D in the final drinking product, wherein the control steps are flow rate of re-mineralized treated water, dosing rate of the stock solution of the dispersible vitamin D, and ozone levels;
   mixing the right amount of the stock solution of vitamin D composition with the re-mineralized treated water; and
   filling UV-barrier/PET bottle with vitamin-D fortified re-mineralized treated water, wherein the UV-barrier/PET bottle is made of PET resin mixed with a UV scavenger to protect the vitamin-D fortified re-mineralized treated water against UV light, wherein the drinking product has a shelf life of at least about 5 months.

18. The method of claim 17, wherein a determined dose of calcium is added to the vitamin D-fortified mineral water.

19. The method of claim 18, wherein vitamin D dosing is carried out simultaneously with calcium dosing.

20. The method of claim 18, wherein vitamin D dosing is carried out consecutively with calcium dosing.

21. The method of claim 17, wherein the UV scavenger is added to PET at a concentration of about 0.21%.

22. The method of claim 17, wherein the step of water treatment essentially comprises: primary treatment, pre-treatment, and post treatment of raw water.

23. The method of claim 22, wherein the primary treatment of the raw water essentially comprises the sub-steps of microfiltration, disinfection, pH adjustment, flocculation, and filtration steps.

24. The method of claim 22, wherein the pre-treatment of water essentially comprises the sub-steps of: micron filtration, cooling through heat exchanger plate, pH adjustment, anti-scalant dosing, reverse osmosis, disinfection, and pH balancing.

25. The method of claim 17, wherein the ozonated water has residual ozone concentration of about 0.20 to about 0.25 ppm.

\* \* \* \* \*